(12) United States Patent
Macary et al.

(10) Patent No.: US 8,028,205 B2
(45) Date of Patent: Sep. 27, 2011

(54) SYSTEM FOR PROVIDING PERFORMANCE TESTING INFORMATION TO USERS

(75) Inventors: John S. Macary, Marlborough, CT (US); O'Rayan C. Velarde, Hartford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 207 days.

(21) Appl. No.: 12/413,682

(22) Filed: Mar. 30, 2009

(65) Prior Publication Data

US 2010/0251032 A1 Sep. 30, 2010

(51) Int. Cl.
*G06F 11/00* (2006.01)

(52) U.S. Cl. .......................................... 714/57; 714/39

(58) Field of Classification Search ....................... 714/57
See application file for complete search history.

(56) References Cited

U.S. PATENT DOCUMENTS

| | | | |
|---|---|---|---|
| 5,859,963 A | 1/1999 | O'Dowd et al. | |
| 5,974,572 A | 10/1999 | Weinberg et al. | |
| 6,002,871 A * | 12/1999 | Duggan et al. | 717/135 |
| 6,167,534 A | 12/2000 | Straathof et al. | |
| 6,249,886 B1 | 6/2001 | Kalkunte | |
| 6,449,739 B1 * | 9/2002 | Landan | 714/47 |
| 6,477,483 B1 * | 11/2002 | Scarlat et al. | 702/186 |
| 6,738,933 B2 * | 5/2004 | Fraenkel et al. | 714/47 |
| 7,739,550 B2 * | 6/2010 | Yamamoto et al. | 714/38 |
| 2003/0065986 A1 * | 4/2003 | Fraenkel et al. | 714/47 |
| 2008/0010542 A1 * | 1/2008 | Yamamoto et al. | 714/38 |
| 2008/0010543 A1 * | 1/2008 | Yamamoto et al. | 714/38 |

* cited by examiner

*Primary Examiner* — Scott T Baderman
*Assistant Examiner* — Kamini Patel
(74) *Attorney, Agent, or Firm* — Buckley, Maschoff & Talwalkar LLC

(57) ABSTRACT

A computer system includes server computers, application program storage modules, a communication network, client computers, a database storage module, and a test data presentation module. The database storage module stores event data. The event data logs events that occur in the server computers during performance test runs. The test runs are performed in connection with a plurality of projects. The projects are defined for performance testing the application programs. The test data presentation module generates a test data screen display for rendering by one of the client computers. The test data screen display includes a data table. The data table presents event data relating to events that occurred during test runs for two or more of the projects.

19 Claims, 23 Drawing Sheets

| | | | |
|---|---|---|---|
| Host Status All. – Retrieves the Status of the specified All Host from Performance Center database. | | | |
| Host ▶ | Purpose | Location ◆ | Condition ◆ | Pool ◆ |
| adlbldpcl001 | Load Generator | BoulderCO | Operational | BoulderCOPool |
| adlbldpcl002 | Load Generator | BoulderCO | Operational | BoulderCOPool |
| adlbldpcl003 | Load Generator | BoulderCO | Operational | BoulderCOPool |
| adlbldpcl004 | Load Generator | BoulderCO | Operational | BoulderCOPool |
| adlbldpcl005 | Load Generator | BoulderCO | Operational | BoulderCOPool |
| adlbldpcl006 | Load Generator | BoulderCO | Operational | BoulderCOPool |
| adlbldpcl007 | Load Generator | BoulderCO | Operational | BoulderCOPool |
| adlbldpcl008 | Load Generator | BoulderCO | Operational | BoulderCOPool |
| adlbldpcl009 | Load Generator | BoulderCO | Operational | BoulderCOPool |
| adlbldpcl010 | Load Generator | BoulderCO | Operational | BoulderCOPool |
| adlhfdmer804 | Controller | HartfordCT | Operational | Controllers |
| adlhfdmer805 | Controller | HartfordCT | Operational | Controllers |
| adlhfdmer806 | Controller | HartfordCT | Operational | Controllers |
| adlhfdmer807 | Controller | HartfordCT | Operational | Controllers |
| adlhfdmer808 | Controller | HartfordCT | Operational | Controllers |
| adlhfdmer809 | Controller | HartfordCT | Operational | Controllers |
| adlhfdmer811 | Controller | HartfordCT | Operational | Controllers |
| adlhfdmer812 | Controller | HartfordCT | Operational | Controllers |
| adlhfdmer813 | Controller | HartfordCT | Operational | Controllers |
| adlhfdmer814 | Controller | HartfordCT | Operational | Controllers |
| adlhfdpcl001 | Load Generator | HartfordCT | Operational | HartfordPool |

FIG. 12

SYSTEM FOR PROVIDING PERFORMANCE TESTING INFORMATION TO USERS

FIELD

The present invention relates to computer systems and more particularly to performance testing of computer systems.

BACKGROUND

In U.S. Pat. Nos. 5,974,572; 6,477,483 and 6,002,871, software and/or hardware systems are disclosed for load testing or other types of performance testing of computer applications or systems. Software packages are also commercially available for load testing of enterprise computer systems. Conventional load testing software allows application programs in an enterprise computer system to be exercised by using scripts that simulate virtual users of the system. While conventional performance testing software generally performs the testing itself in a satisfactory manner, the present inventors have recognized deficiencies in the state of the art with respect to what information about testing projects is made available to system users and/or with respect to how the information is made available to users.

SUMMARY

A computer system includes one or more server computers, each of which includes at least one processing unit. The computer system further includes a plurality of application program storage modules. Each of the application storage modules is coupled to at least one of the processing units and stores at least one application program to be executed on at least one of the processing units. Another component of the computer system is a communications network, with one or more of the server computers coupled to the communication network.

The computer system further includes a plurality of client computers that are coupled to the communication network. Each of the client computers includes a respective display unit. At least some of the client computers are programmed to execute performance test scripts. The performance test scripts, when executed by the client computers, cause the client computers to exercise at least one of the application programs in a manner that simulates access to the application program(s) in question by a respective user.

In addition, the computer system includes at least one database storage module. The latter module is coupled to at least one of the processing units and stores event data. The event data logs events that occur in the server computer or computers while the application program(s) is (are) exercised by the client computers in a plurality of test runs. The test runs are performed in connection with a plurality of projects. Each project is defined for performance testing a particular one of the application programs.

Still further, the computer system includes a test data presentation module coupled to the database storage module(s). The test data presentation module is accessible by at least one of the client computers and generates a test data screen display for rendering by the at least one of the client computers via the display unit of the at least one client computer. The test data screen display includes a data table. The data table presents event data retrieved by the test data presentation module from the database storage module(s). The test data screen display includes data arrayed in the data table in a plurality of rows and a plurality of columns. Each of the rows in the data table presents data with respect to a respective event that occurred during one of the test runs. One of the columns presents event identifiers for the events. Another column presents descriptions for the events. A third column presents test run identifiers for the test runs during which the events occurred. The rows of the data table collectively present data for events that occurred during test runs for two or more projects.

In other aspect of the invention, a computer system may include the same hardware and software components, interrelated in the same manner, as described above. However, instead of or in addition to the event data referred to above, the data storage module(s) may store another type or types of test data relating to the performance testing projects. Moreover, the test data presentation module may operate to generate for rendering by the client computers another type of test data screen display. The latter type of test data screen display may include a data table that includes data arrayed in columns and rows, with each row indicating a respective user assigned to one of the performance testing projects, and the data table includes rows for all of the users assigned to the project in question.

In still another aspect of the invention, the hardware and software components of the computer system again may be the same as described above, and again the test data presentation module may generate still another type of test data screen for rendering by the client computers. For this aspect of the invention, the screen display again includes a data table that includes at least one column. The column has a plurality of entries and each entry indicates a respective project to which a selected user is assigned. The column/data table includes entries that correspond to all projects to which the selected user is assigned.

One or more of these approaches to presenting test data may give users a fuller picture of the results of performance testing, and/or a fuller picture of the attributes of performance testing projects, than has been available in conventional data presentations from performance testing software programs.

With these and other advantages and features of the invention that will become hereinafter apparent, the invention may be more clearly understood by reference to the following detailed description of the invention, the appended claims, and the drawings attached hereto.

BRIEF DESCRIPTION OF THE DRAWINGS

FIGS. 8-23 show example screen displays that may be provided to user computers by the test data presentation module in accordance with one or more aspects of the present invention.

DETAILED DESCRIPTION

In general, and for the purposes of introducing concepts of embodiments of the present invention, a performance testing system for an enterprise computer system provides information resources to users that have previously not been available. For example, users are provided with data displays that present all events that occurred—across all performance testing projects—during a selected time interval. Other data displays indicate what users are assigned to a selected project, or what are the projects to which a selected user is assigned.

Figure 1:
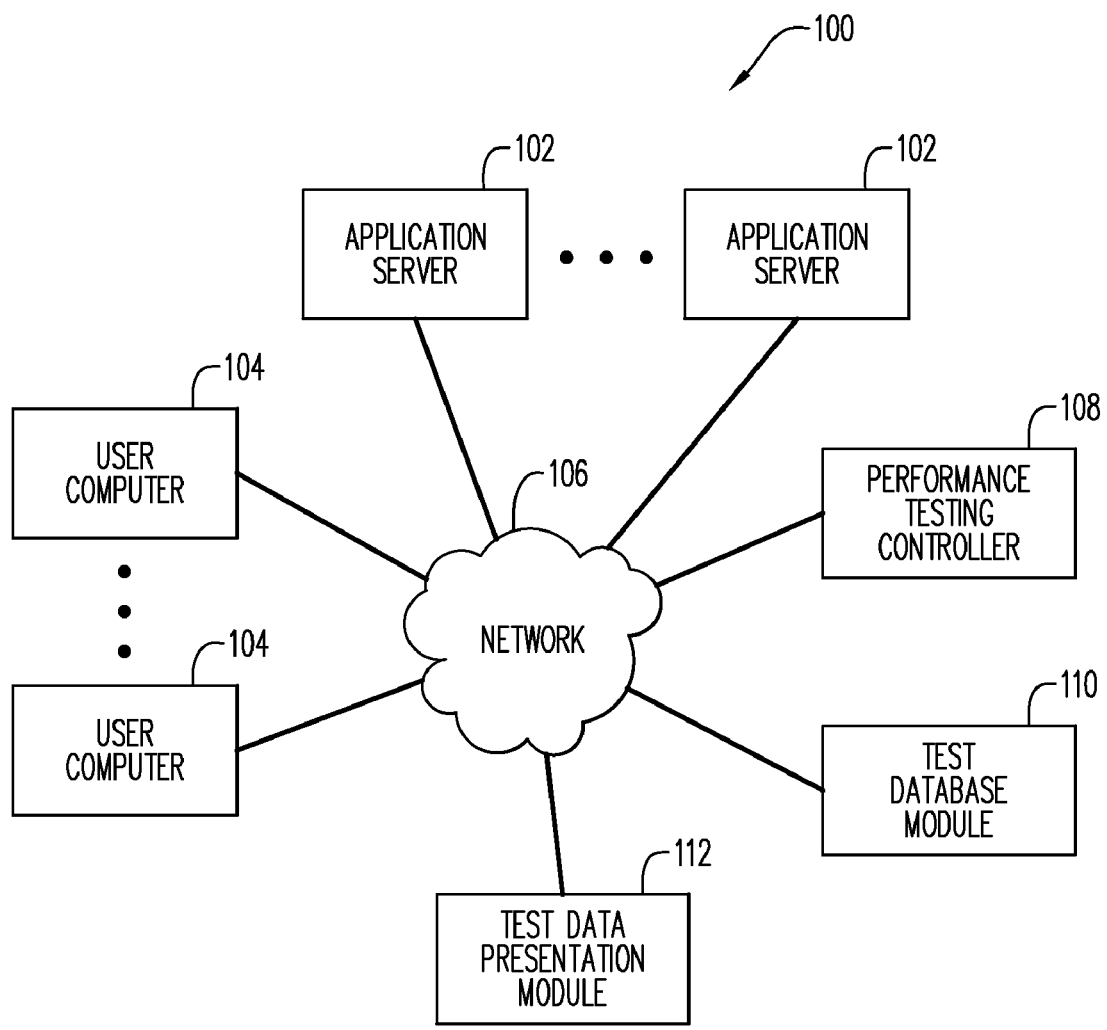
FIG. 1 is a block diagram that illustrates a computer system provided in accordance with aspects of the present invention.

FIG. 1 is a block diagram that illustrates a computer system 100 provided in accordance with aspects of the present invention. The computer system 100 may be a so-called "enterprise" system that is suitable for handling data processing needs of a large organization.

From the point of view of ordinary functioning of the computer system 100, it includes three major components or types of components, namely application servers 102, user computers 104 and a data communication network 106. All may be conventional in their hardware aspects, and in many of their software components. Indeed, the application servers 102 may be entirely conventional, and the user computers 104 may depart from conventional operation only in terms of types of performance testing information that the user computers request and display.

The application servers 102 and the user computers 104 may all be coupled to the data communication network 106 in a conventional manner to permit exchanges of data among the application servers 102 and the user computers 102. The application servers 102 will be described further below, but in their essential functioning they store and execute various application programs that provide to users functions desired from the computer system 100. The user computers 104 will also be described further below, but will be understood to be the conventional desktop and/or laptop personal computers of the types used by employees of the organization in their offices and/or while traveling. To some extent the user computers may function in a client-to-server role relative to server computers that are part of the computer system 100. Consequently, the user computers may also be referred to as client computers.

The computer system 100 also includes a performance testing controller 108. The performance testing controller 108 may be coupled to the data communication network 106 in such a manner that it is able to interact with at least some of the application servers 102 and possibly also with at least some of the user computers 104. The performance testing controller 108 may be entirely conventional. For example, in hardware aspects it may be constituted as a server computer, and it may execute one or more conventional load-testing or performance testing programs. It may be the case, for example, that the performance testing controller 108 load tests one or more of the application programs on the application servers 102 by executing performance test scripts and/or by causing at least some of the application servers 102 and/or the user computers 104 to execute performance test scripts. The execution of the performance test scripts may simulate accessing of the application programs by respective virtual users or by actual users (either or both of which may be encompassed by the term "users").

In accordance with conventional practices, the performance test scripts may be performed in connection with test runs. A test run is defined by system resources to be used for a test, and particular test scripts to be executed by the system resources. A test run is executed in a time slot, which is a particular period of time during which the system resources are made available for the test run.

Test runs, in turn, may be performed as part of a performance testing project. A performance testing project may be designed by one or more IT professionals to appraise present or future performance of an application that is or is planned to be executed in the computer system 100 (and particularly in one or more of the application servers 102). Typically, a number of IT professionals may be assigned various roles with respect to a performance testing project. It is not unusual over a period of time to have a number of performance testing projects at various stages of planning or partial completion in the computer system 100.

Execution of test runs may result in "events" which may be system or computer errors or other occurrences that deviate from desired functioning of the application-under-test or of the system in general.

Although the performance testing controller 108 is shown separately from the application servers 102, nevertheless in some embodiments it may be integrated with one of the application servers 102.

Continuing to refer to FIG. 1, the computer system 100 also includes a test database module 110. The test database module 110 may be coupled to the data communication network 106. The test database module 110 may serve as a repository for data concerning, or generated as a result of, performance testing performed or controlled by the performance testing controller 108. Although the test database module 110 is shown as separate from the performance testing controller 108, in some embodiments it may be part of or associated with a server computer (not separately shown) that may also constitute the performance testing controller 108. Further details of the test database module 110 will be described below.

In addition, the computer system 100 also includes a test data presentation module 112. The test data presentation module 112 is coupled to the data communication network 106 and may in some embodiments be integrated with either or both of the test database module 110 and/or the performance testing controller 108. Thus, in its hardware aspects the test data presentation module 112 may be constituted by a server computer which may or may not perform other functions as well.

The test data presentation module 112 operates to handle requests for test data from user computers 104 and to download to the user computers 104 page displays of the requested test data. The test data presentation module 112 may operate in accordance with aspects of the present invention to provide novel varieties of screen displays with respect to the test data stored in the test database module 110. Examples of screen displays generated by the test data presentation module 112 to the user computers 104 are shown herein as FIGS. 8-23. Those drawings and other details of the test data presentation module 112 will be described further below.

Figure 2:
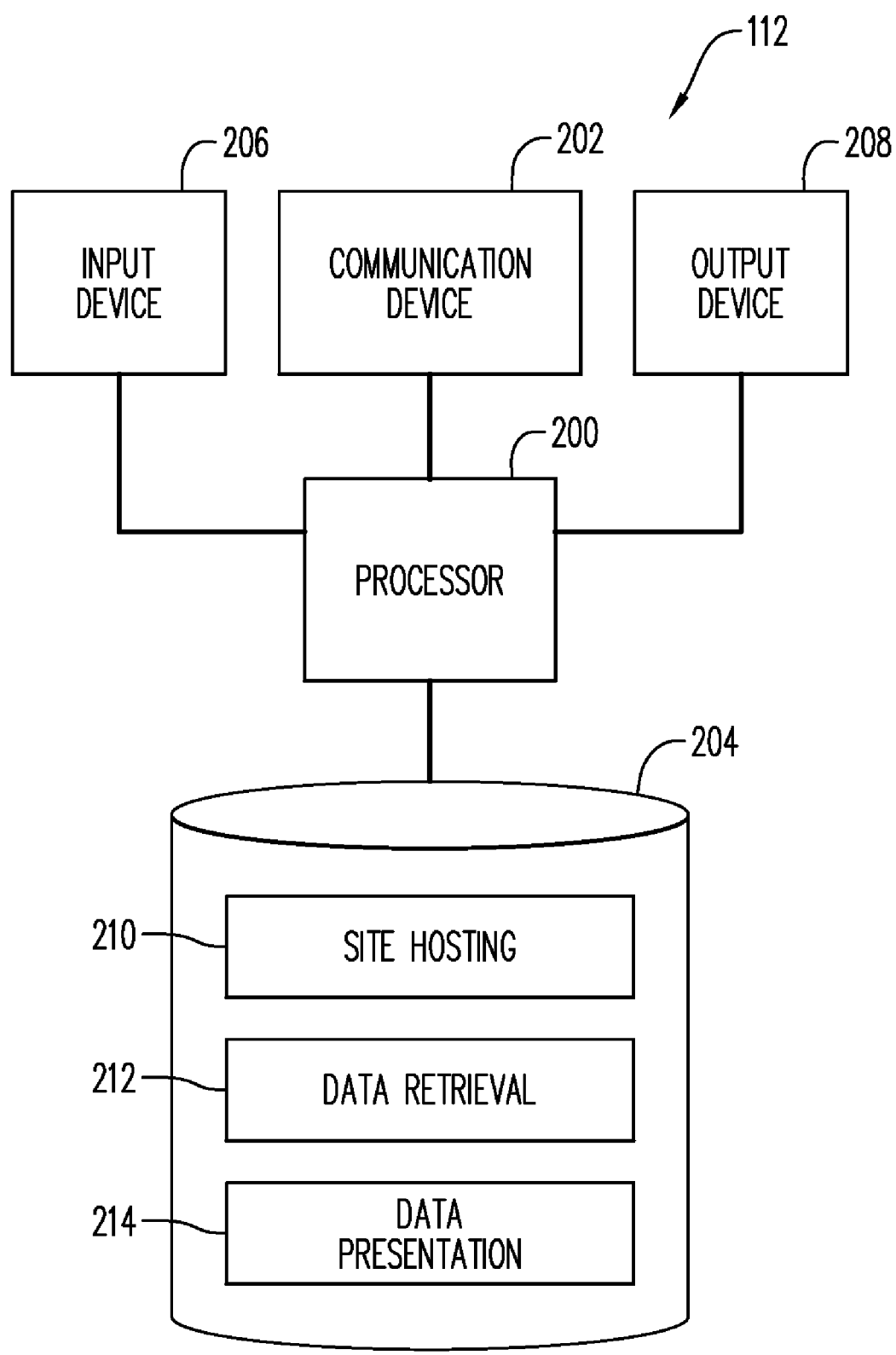
FIG. 2 is a block diagram illustration of a server computer that may serve as the test data presentation module in the computer system of FIG. 1.

FIG. 2 is a block diagram that illustrates an example embodiment of the test data presentation module 112. In its hardware aspects the test data presentation module 112 may be entirely conventional, but may be programmed to operate in accordance with aspects of the present invention. In a practical embodiment, the test data presentation module 112 may be constituted by a conventional server computer programmed by software that implements functionality as described herein. As noted above, such a server computer may perform additional functions beyond those described herein with respect to the test data presentation module 112.

As depicted, the test data presentation module 112 includes a computer processor 200 operatively coupled to, and in communication with, a communication device 202, a storage device 204, one or more input devices 206 and one or more output devices 208. Communication device 202 may be used to facilitate communication with, for example, other devices, such as the user computers 104, and the test database module 110 (if provided separately from the test data presentation module 112). The input device(s) 206 may comprise, for example, a keyboard, a keypad, a mouse or other pointing device, a microphone, knob or a switch, an infra-red (IR) port, a docking station, and/or a touch screen. The input device(s) 206 may be used, for example, to enter information. Output device 208 may comprise, for example, a display (e.g., a display screen) a speaker, and/or a printer.

Storage device 204 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices. As used herein and in the appended claims, a "memory" refers to any one or more of the components of the storage device 204, including removable storage media.

Storage device 204 stores one or more programs (at least some of which being indicated by blocks 210, 212 and 214) for controlling processor 200. Processor 200 performs instructions of the programs, and thereby operates in accordance with the present invention. The program indicated at 210 may operate in accordance with conventional principles to provide a test data access website that is accessible from the user computers 104. It should be noted, however, that the test data access website may provide novel data access options which are not provided in or by conventional performance test software systems.

The program indicated at 212 submits requests for data retrieval to the test database module 110, and receives the data retrieved as a result of the requests from the test database module 110. The requests for data retrieval may reflect requests received from user computers 104 that have accessed the test data presentation module 112 via the site hosting function provided by the program 210.

The program indicated at 214 assembles the data retrieved from the test database module 110 to generate screen displays for rendering by the requesting user computer 104. Examples of such screen displays are shown in FIGS. 8-23 and will be discussed below. The overall effect of the programs 210, 212 and 214, as provided in accordance with the present invention, is to provide users of the computer system 100 with novel options for requesting, retrieving and viewing data concerning performance test results and performance test projects.

There may also be stored in the storage device 204 other software, such as one or more conventional operating systems, database management software, device drivers, communications software, etc.

Figure 3:
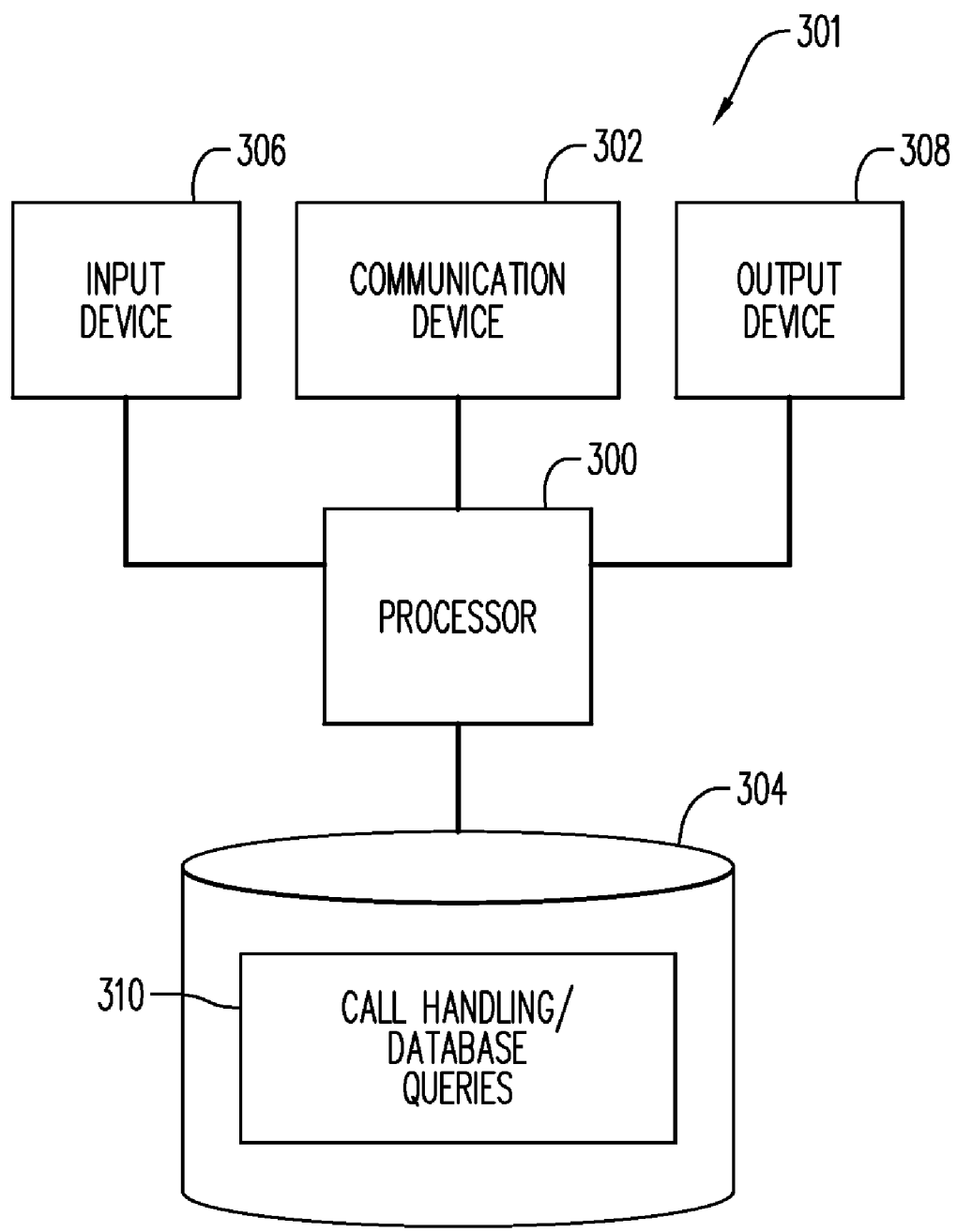
FIG. 3 is a block diagram illustration of a server computer that may handle calls for web services from the test data presentation module.

FIG. 3 is a block diagram illustration of a server computer 301 that may handle calls for web services from the test data presentation module 112. Although not explicitly shown in FIG. 1, the server computer 301 may be included in the computer system 100 and may be coupled to the data communication network 106. The server computer 301 may, but need not, be integrated with any of the server computers shown in FIG. 1 or discussed herein.

In its hardware aspects, the server computer 301 may be conventional, and similar to the hardware components described above in connection with the test data presentation module 112. The hardware aspects of the server computer 301 will therefore not be further described, except to mention (referring to FIG. 3) that the server computer 301 may include a processor 300 in communication with a communication device 302, a storage device 304, an input device 306, and an output device 308. Processor 300 operates to execute processor-executable steps, contained in program instructions, so as to control the server computer 301 to provide desired functionality.

The storage device 304 may store an application program 310 that allows the server computer 301 to receive and handle calls for data retrieval from the test data presentation module 112 and to execute database queries relative to the test database module 110 in response to the data retrieval calls from the test data presentation module 112.

Figure 4:
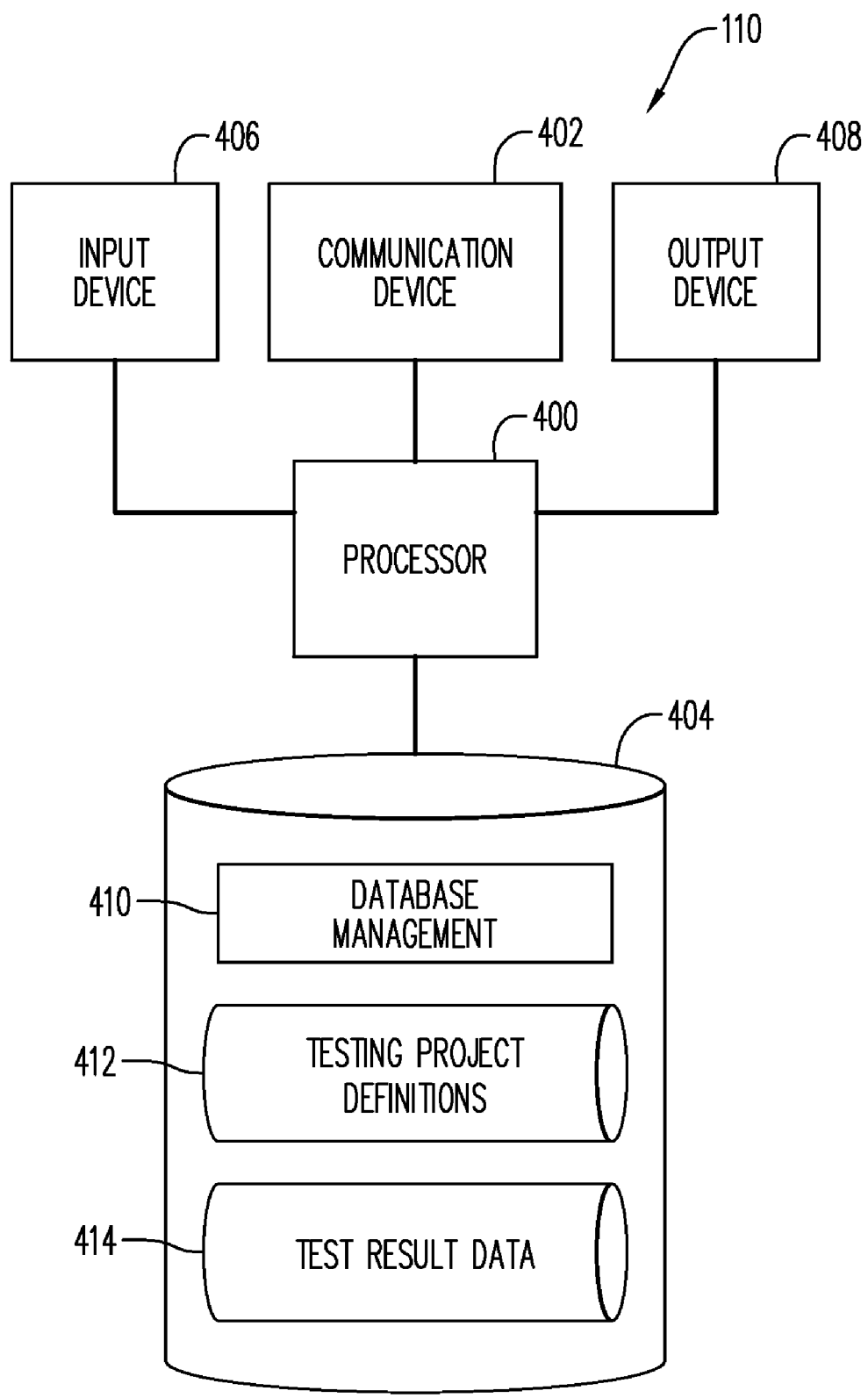
FIG. 4 is a block diagram illustration of a server computer that may serve as the test database module in the computer system of FIG. 1.

FIG. 4 is a block diagram illustration of a server computer that may serve as the test database module 110. Like the server computer 301, with which it may be integrated, the test database module 110 may be conventional in its hardware aspects. Thus the test database module 110 may have hardware that is similar to the hardware components described above in connection with the test data presentation module 112. The hardware aspects of the test database module 110 will therefore not be further described, except to note that the test database module 110 may include a processor 400 in communication with a communication device 402, a storage device 404, an input device 406, and an output device 408. Processor 400 operates to execute processor-executable steps, contained in program instructions, so as to control the test database module 110 to provide desired functionality.

The storage device 404 may store a conventional database management program 410 to control processor 400. In addition, the storage device 404 may store a database 412 that contains data for defining attributes of present, past and future performance testing projects executed or to be executed in the computer system 100 under the control of the performance testing controller 108. Further, the storage device 404 may store a database 414 that contains data generated in connection with the performance testing projects.

Figure 5:
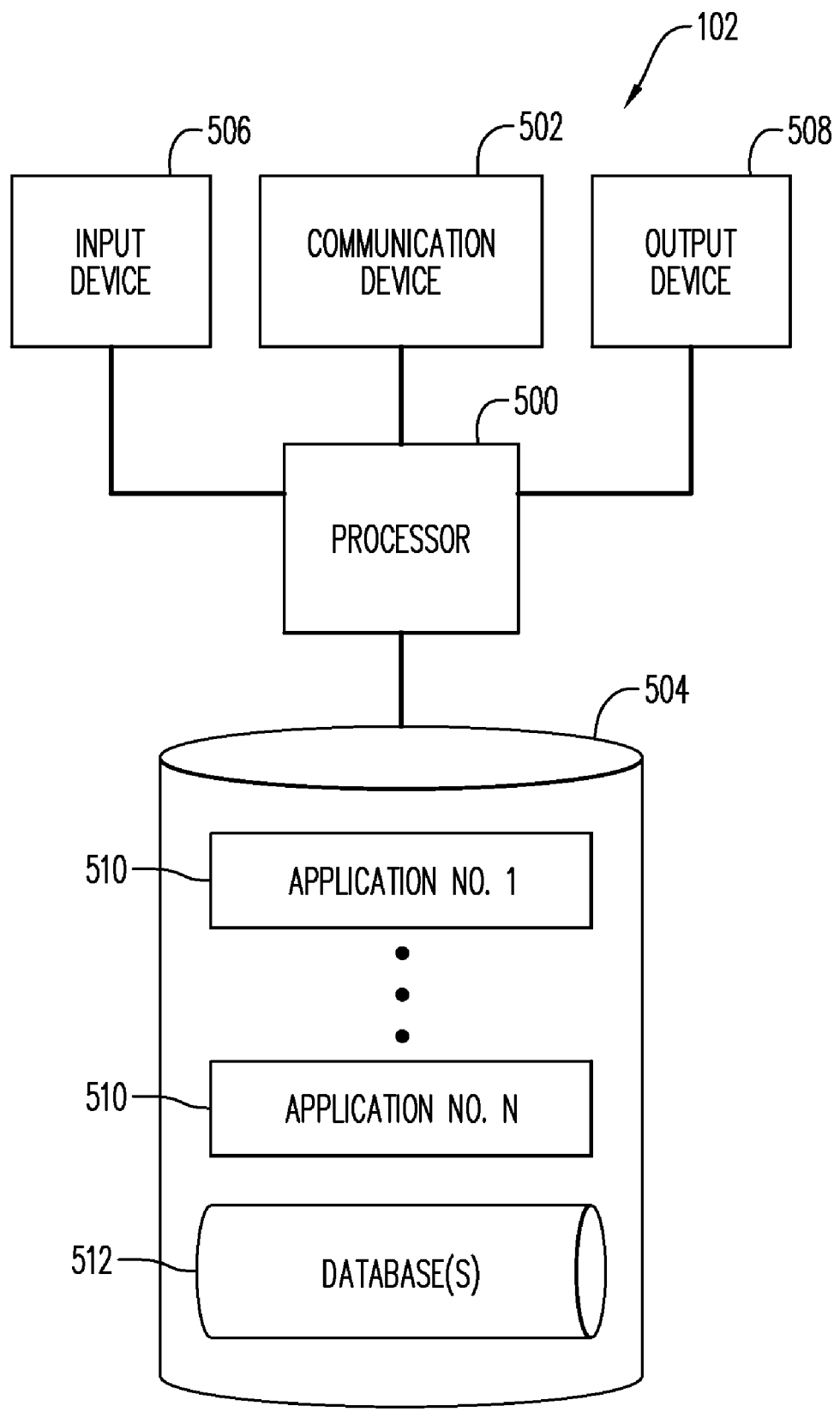
FIG. 5 is a block diagram illustration of a typical one of the application server computers shown in FIG. 1.

FIG. 5 is a block diagram illustration of a typical one of the application server computers 102 shown in FIG. 1. The application server 102 may be entirely conventional in both its hardware and software aspects, and indeed in all respects. That is, the application server 102 may be a typical server computer that is employed in an enterprise data processing system. Nevertheless, some aspects of both the hardware and software constituting the application server 102 will now be briefly discussed.

The application server 102 may include a processor 500 in communication with a communication device 502, a storage device 504, an input device 506, and an output device 508. Processor 500 operates to execute processor-executable steps, contained in program instructions, so as to control the application server 102 to provide desired functionality. The processor 500 may be constituted by one or more conventional processing units, which are not separately shown.

The storage device 504 may store a number of conventional application programs 510 and thus may function as an application program storage module. The storage device 504 is in communication with, and thus is coupled to, the processor 500. The application programs 510 are executed by the processor 500 as required to provide desired functionality to the users of the computer system 100. The application programs 510 may include any application program customarily or hereafter run on an enterprise data processing system.

The storage device 504 may also store one or more databases 512 that are maintained or utilized by the application programs 510.

Figure 6:
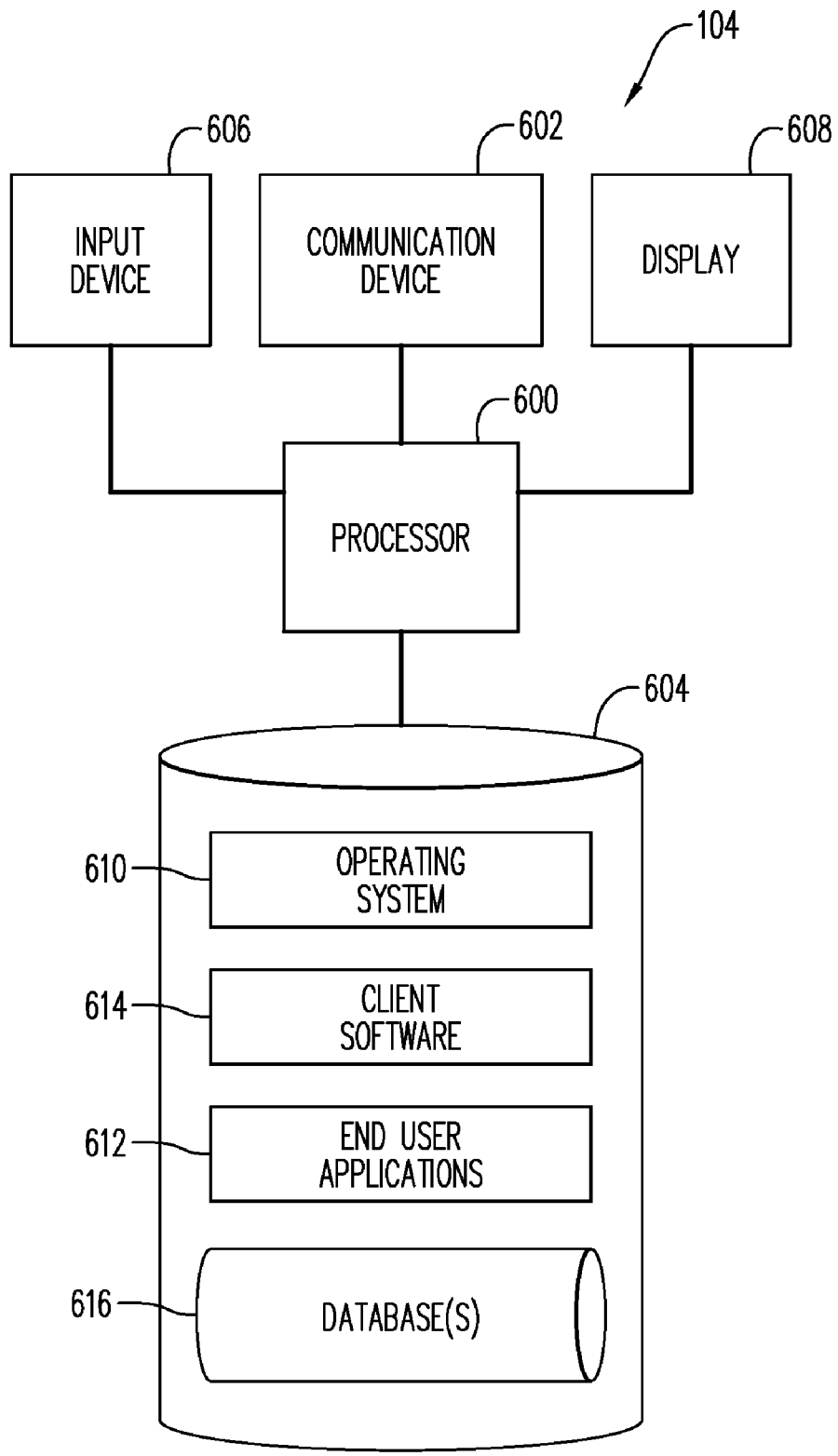
FIG. 6 is a block diagram illustration of a typical one of the user computers shown in FIG. 1.

FIG. 6 is a block diagram illustration of a typical one of the user computers 104 shown in FIG. 1. Again the user computer 104 may be entirely conventional in its hardware aspects. Its software aspects may also be conventional, in terms of programs installed in the user computer 104, but in its functioning as a client device, the user computer has access to novel functionality made available through the test data presentation module 112.

While a user computer 104 may typically be somewhat different in its actual hardware embodiment from, say, an application server 102, in conceptual terms the architecture of a user computer may resemble that of a server computer, as reflected by the block diagram illustration in FIG. 6 of the user computer. Thus, the user computer 104 may include a processor 600 in communication with a communication device 602, a storage device 604, an input device 606, and a display unit 608. Processor 600 operates to execute processor-executable steps, contained in program instructions, so as to control the user computer 104 to provide desired functionality. The storage device 604 may include one or more of the types of device referred to above in connection with the storage device 204 shown in FIG. 2. The software programs stored in the storage device 604 control the processor 600 to provide conventional functionality, and functionality described herein. The user computer 104 may include one or more output devices (not shown), such as a printer, in addition to the display unit 608.

The software programs installed in the user computer 104, and thus stored on the storage device 604 may include a conventional operating system 610, and conventional end user/office applications 612 such as a word processing program, a spreadsheet program, etc. Also, the software programs installed in the user computer 104 and stored on the storage device 604 may include a conventional browser 614, or other software that allows the user computer 104 to function as a client and to obtain services from the application servers 102 and/or the test data presentation module 112. Also, the storage device 604 may store one or more databases 616 maintained or utilized by the user computer 104.

Figure 7:
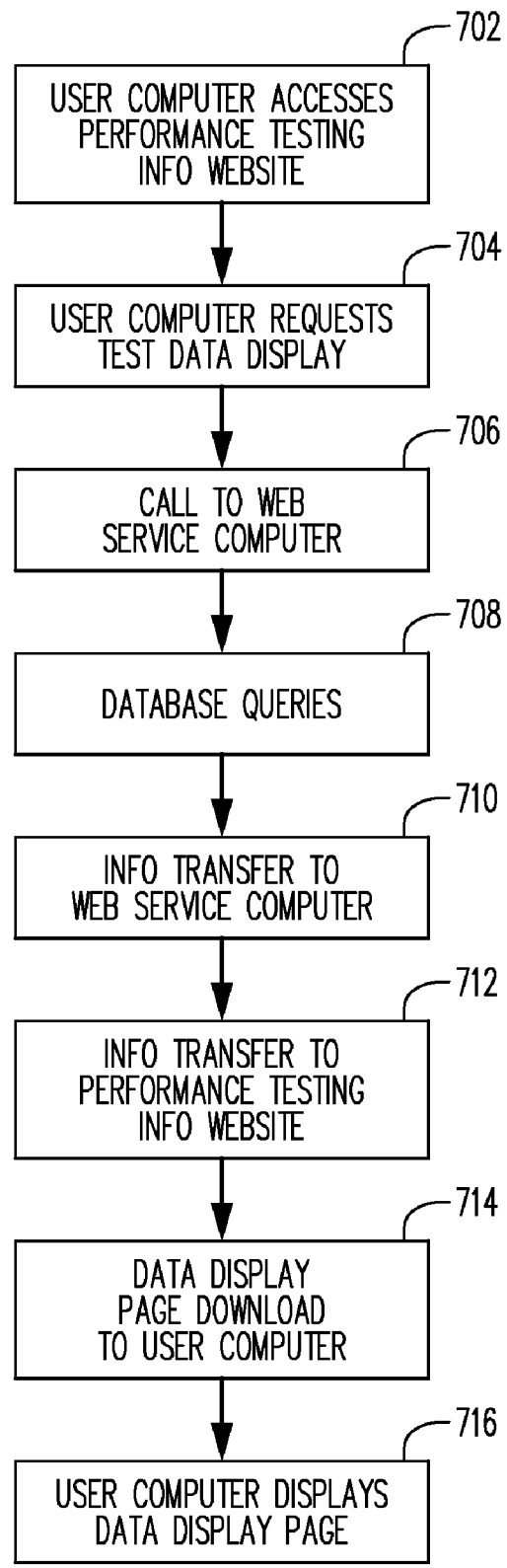
FIG. 7 is a flow chart that illustrates a data retrieval and presentation process that may be performed in the computer system of FIG. 1.

FIG. 7 is a flow chart that illustrates a data retrieval and presentation process that may be performed in the computer system 100 in accordance with aspects of the present invention.

At 702 in FIG. 7, a user operates one of the user computers 104 to access a performance testing information website hosted by the test data presentation module 112. In response to this access, the test data presentation module 112 generates a screen display (e.g., in html or in another manner) such as FIG. 8 for rendering on the user computer 104. (Alternatively, the test data presentation module 112 may generate a "welcome" screen or the like, from which the user may navigate to the screen display shown in FIG. 8.) Details of the screen display of FIG. 8 will be discussed below. For present purposes it is sufficient to remark that the screen display presents a menu 802 of test data display services that the test data presentation module 112 makes available to users.

At 704 the user computer generates and sends to the test data presentation module 112 a request for a download of test data. This step may include the user's selection of a particular service from the menu 802 (FIG. 8) and interaction by the user with a subsequent screen display to define the data that the user wishes to view.

At 706, the test data presentation module 112 executes a call to the server computer 301 (FIG. 3) to request service of the data download requested by the user. At 708 the server computer 301 executes one or more database queries to the test database module 110 to service the request from the test data presentation module 112. At 710, data retrieved as a result of the database query or queries is transferred to the server computer 301. At 712 the data is in turn transferred from the server computer 301 to the test data presentation module 112.

At 714, the test data presentation module 112 assembles a data display page (screen display) from the data transferred to it at 712, and generates the screen display for rendering by the user computer 104 which made the request at 704. Examples of such screen displays appear among FIGS. 8-23 and are discussed below. At 716, the user computer 104 in question displays the screen display on its display unit 608 (FIG. 6).

As noted above, the screen display shown in FIG. 8 is generated by the test data presentation module 112 for rendering by the user computer 104 and is displayed by the user computer in response to the user computer accessing the test data presentation module 112. The screen display of FIG. 8 includes a menu 802 that lists services available to the user from the test data presentation module 112. In a main window 804 of the screen display, text is displayed to provide brief descriptions to the user regarding the available data retrieval and display services.

Figure 8:
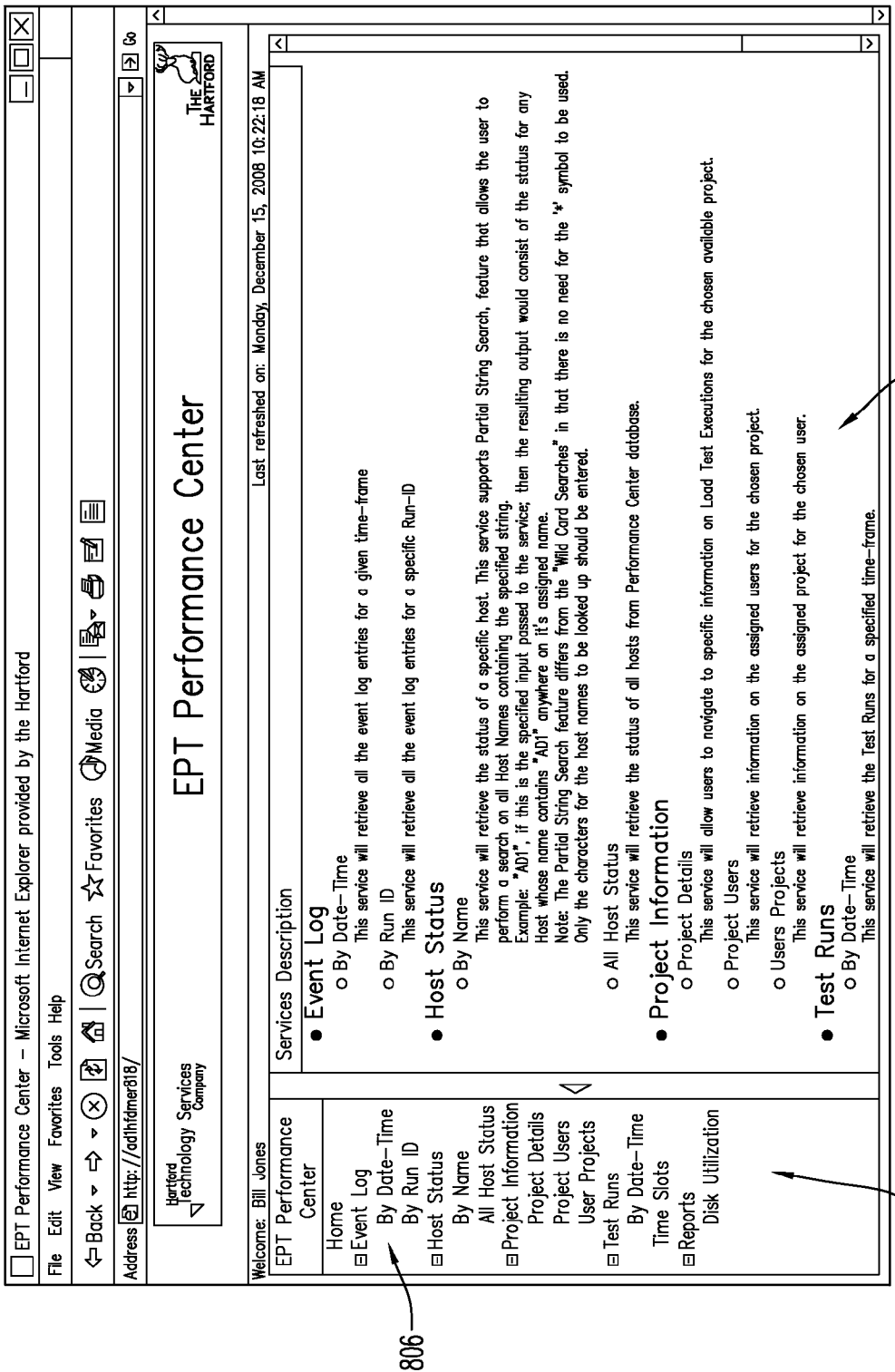

If the user selects item 806 (Event Log—By Date-Time) from the menu 802 shown in FIG. 8, then a screen display (not shown) is presented to the user to enter/select a time interval for which event data is to be retrieved and displayed. (Advancing for the moment to the screen display shown in FIG. 9, data entry fields 902 and 904, and associated calendar displays—not shown—or the like, are provided to allow the user to specify the beginning date/time and the ending date/time for the time interval the user wishes to define.) In response to the user's definition of the time interval, the test data presentation module 112 calls the server computer 301 to retrieve the requested event data. The server computer 301 then executes one or more database queries to the test database module 110 to service the request from the test data presentation module 112. The data thereby retrieved by the server computer 301 is transferred to the test data presentation module 112. The test data presentation module 112 in turn assembles a screen display like that shown in FIG. 9. This screen display is downloaded to the requesting user's computer by the test data presentation module 112.

Figure 9:
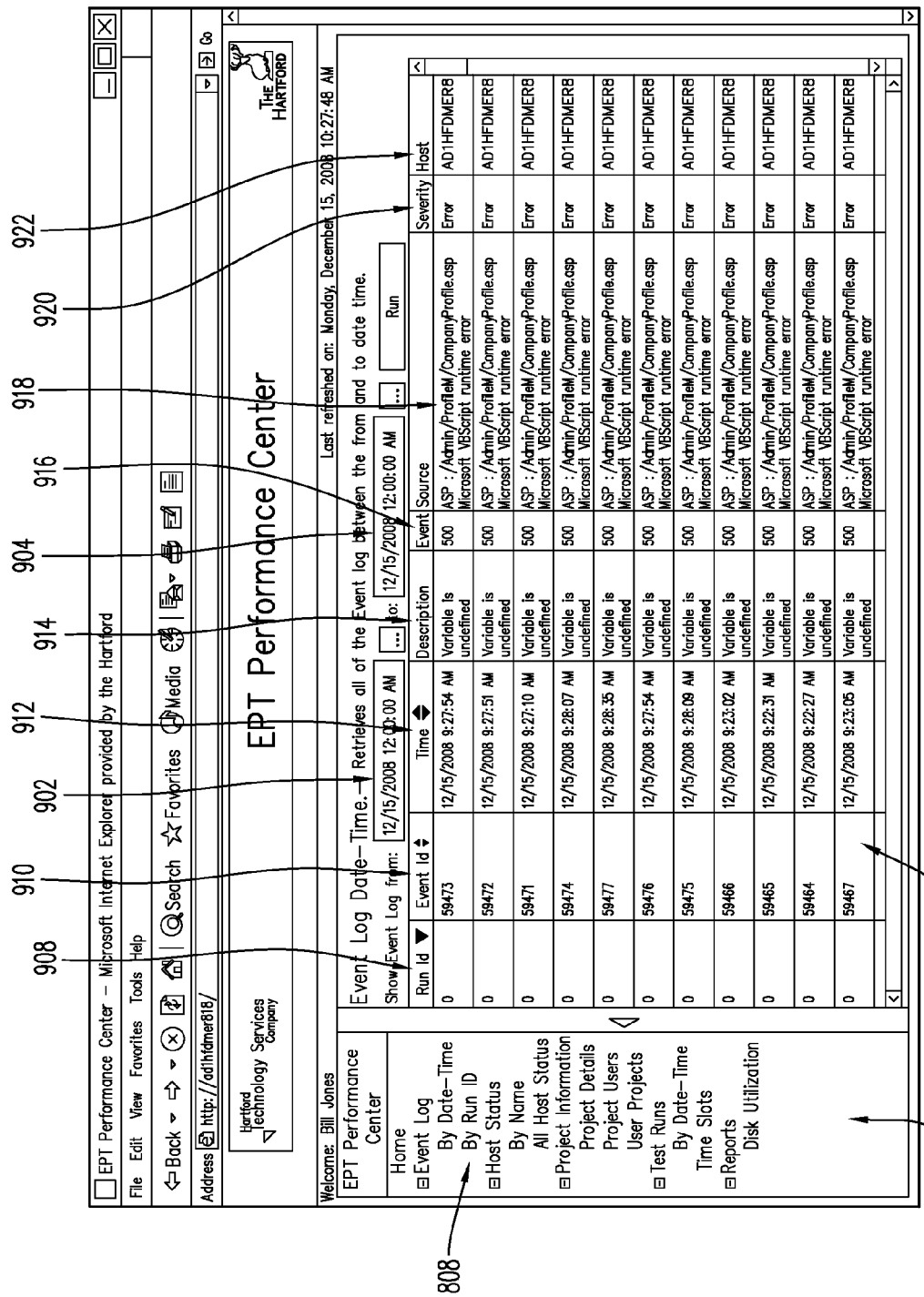

Referring then to FIG. 9, the screen display shown therein includes the above-mentioned menu 802 and data entry fields 902 and 904. In addition, in its main window 906 the screen display shown in FIG. 9 displays a data table arrayed in rows and columns. Each row in the data table presents data with respect to one particular event. A column 908 shows the "Run ID" for the event. That is, the Run ID is an identifier that identifies the test run that produced the event.

A column 910 shows the unique identifier for the event. A column 912 shows the date and time at which the event occurred. A column 914 shows a description of the event. A column 916 shows a code that classifies the event. A column 918 shows the software program/module which is the source of the event. A column 920 shows an indication of the severity of the event. A column 922 contains data that indicates the host computer (e.g., one of the application servers 102) in which the event occurred.

The user is able to scroll down and/or across to view the entirety of the data table of which a portion is visible in FIG. 9. The rows of the data table, in at least some instances, contain events that occurred during test runs for two or more of the above-mentioned performance testing projects. The data table may contain a respective row (entry) for every event that occurred during the selected time period, across all test runs and performance testing projects executed during the selected time period.

If the user selects item 808 (FIG. 9)—which is "Event Log-By Run ID"—from menu 802 (this option is also available via the screen display shown in FIG. 8), then a screen display (not shown) is presented to the user to enter/select a Run ID to identify a test run for which event data is to be retrieved and displayed. (Advancing for the moment to the screen display shown in FIG. 10, a data entry field 1002 is provided for the user to select/enter the Run ID.) As before, the test data presentation module 112 calls the server computer 301 to retrieve the requested data, the server computer 301 retrieves the data via a database query (or queries) to the test database module 110, and the retrieved data is transferred to the test data presentation module 112. The test data presentation module 112 uses the data to assemble a screen display like that shown in FIG. 10. This screen display is rendered by the requesting user's computer.

Figure 10:

The data table shown in the main window 1004 in FIG. 10 may be in the same format and contain the same types of data as the data table shown in FIG. 9. However, it will be appreciated that all of the event data presented in the data table shown in FIG. 10 is for events that occurred during just one test run, which was executed as part of just one performance testing project.

By a similar process, if the user selects menu items 810 or 812 (FIG. 10, also available in the other screen displays), relating to "host status" (i.e., the current condition of various ones of the application servers 102), then data is requested and retrieved, and then assembled by the test data presentation module 112 to generate the screen display shown in FIG. 1 or 12, as the case may be. (To obtain the screen display shown in FIG. 1, the user may need to specify the particular host computer for which status information is to be retrieved and displayed.)

Figure 11:
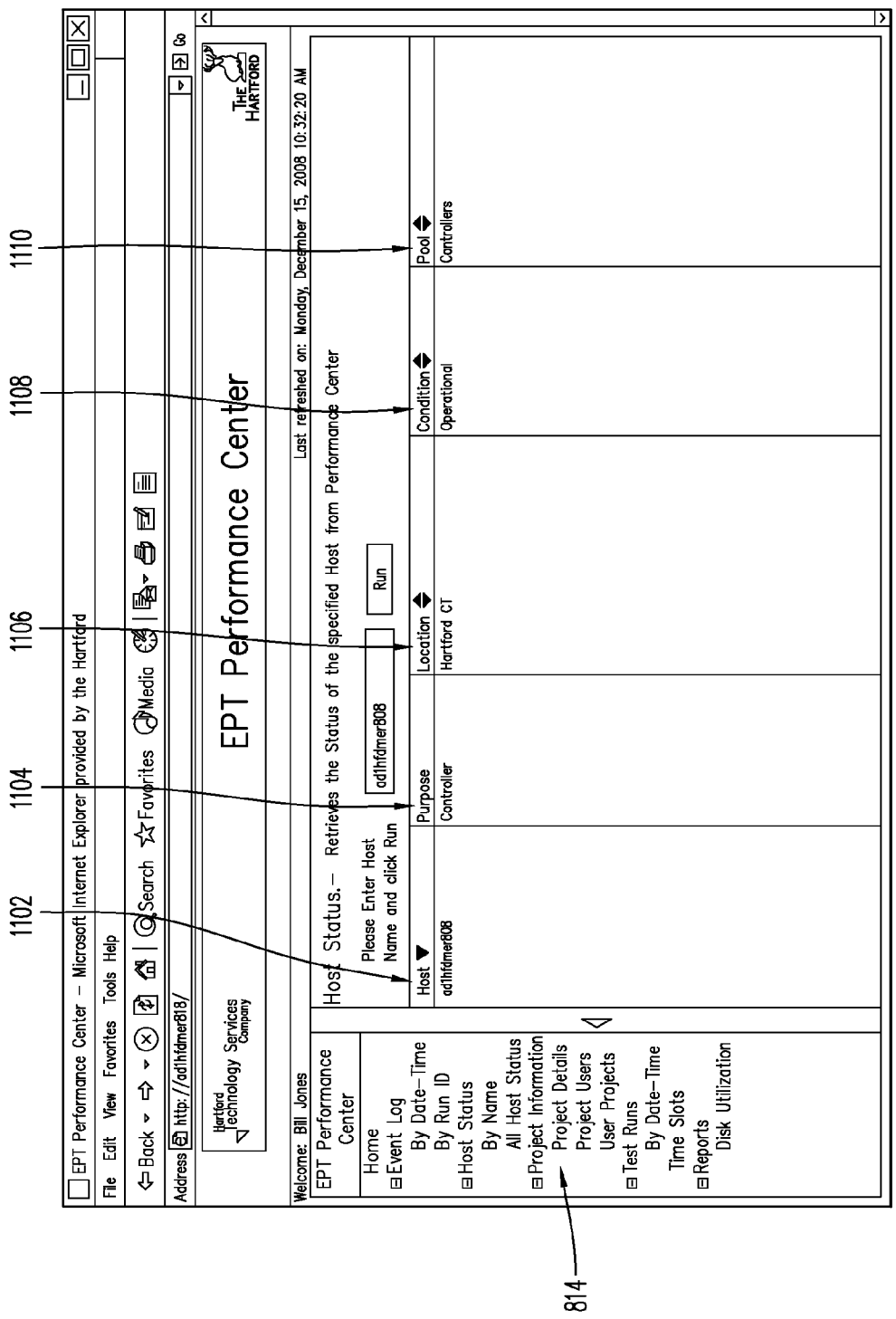

In the data table shown in FIG. 11 or FIG. 12, a column 1102 identifies the host computer in question. A column 1104 identifies the function being performed by the host computer with respect to performance testing operations. A column 1106 indicates the location of the host computer in question. A column 1108 indicates the condition (status) of the host computer in question. A column 1110 identifies a pool of computers that includes the host computer in question.

Figure 13:

If the user selects menu item 814 (FIG. 11, also available in other screen displays), relating to "project details", data is requested and retrieved so that the test data presentation module 112 is able to assemble and generate for rendering by the user's computer, a screen display like that shown in FIG. 13. It will be noted that this screen display lists performance testing projects by name, and allows the user to "drill down" to detailed information concerning test runs performed in connection with the various performance testing projects.

If the user selects menu item 816 (Project Users; see FIG. 13, also available in other screen displays), then a screen display (not shown) is presented to the user to enter/select an identifier for a particular performance testing project in which the user is interested, and for which user data is to be retrieved and displayed. (Advancing for the moment to the screen display shown in FIG. 14, a data entry field 1402, in the form of a drop down menu, is provided to allow the user to select the performance testing project in question.) In response to the user's selection of a performance testing project, the test data presentation module 112 calls the server computer 301 to retrieve the requested user information. The server computer 301 then executes one or more database queries to the test database module 110 to service the request from the test data presentation module 112. The user data thereby retrieved by the server computer 301 is transferred to the test data presentation module 112. The test data presentation module 112 in turn generates a screen display like that shown in FIG. 14 for rendering by the user's computer.

Figure 14:
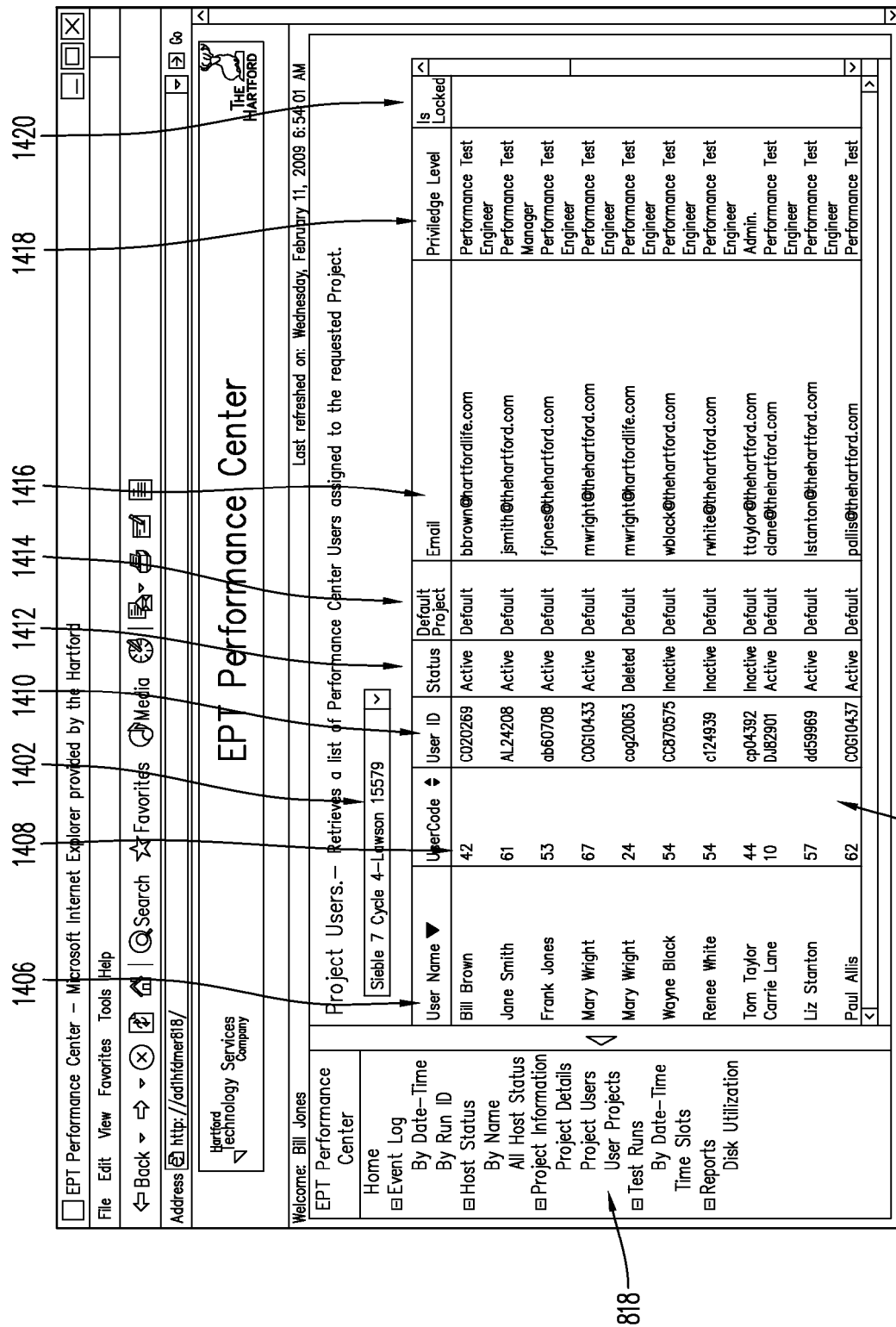

Referring to FIG. 14, the screen display shown therein includes the data entry field 1402, in which the name of the selected project is indicated. Also, in the main window 1404, the screen display shows a data table arrayed in rows and columns. Each row indicates a respective user who has been assigned to the selected performance testing project. A column 1406 indicates the name of the user in question. A column 1408 indicates a code that corresponds to a category of users that includes the user in question. A column 1410 indicates the identification number for the user in question. A column 1412 indicates the status of the user in question. A column 1414 indicates a default project for the user in question. (The "default project" serves as a placeholder to keep user i.d.'s in force.) A column 1416 indicates the email address for the user in question. A column 1418 indicates what level of privileges for the project has been assigned to the user in question. A column 1420 indicates whether the user in question has been locked out of activity with respect to the selected project.

The user to whom the screen display is presented is able to scroll down and/or across to view the entirety of the data table of which a portion is visible in FIG. 14. The rows of the data table collectively contain the names of all users who have been assigned to the selected project.

If the user selects item 818 (User Projects; see FIG. 14, also available in other screen displays) then a screen display (not shown) is presented to the user to enter/select the name of a user for which data is to be retrieved to identify the projects to which the latter user has been assigned. (Advancing for the moment to the screen display shown in FIG. 15, a data entry field 1502, in the form of a drop down menu, is provided to allow the user to identify a user for whom the latter user's project assignments are to be listed.) In response to the selection of the latter user, the test data presentation module 112 calls the server computer to retrieve the requested project assignment data. The server computer 301 then executes one or more database queries to the test database module 110 to service the request from the test data presentation module 112. The data thereby retrieved by the server computer 301 is transferred to the test data presentation module 112. The test data presentation module 112 in turn generates a screen display like that shown in FIG. 15 for rendering by the computer of the user who requested the data.

Figure 15:
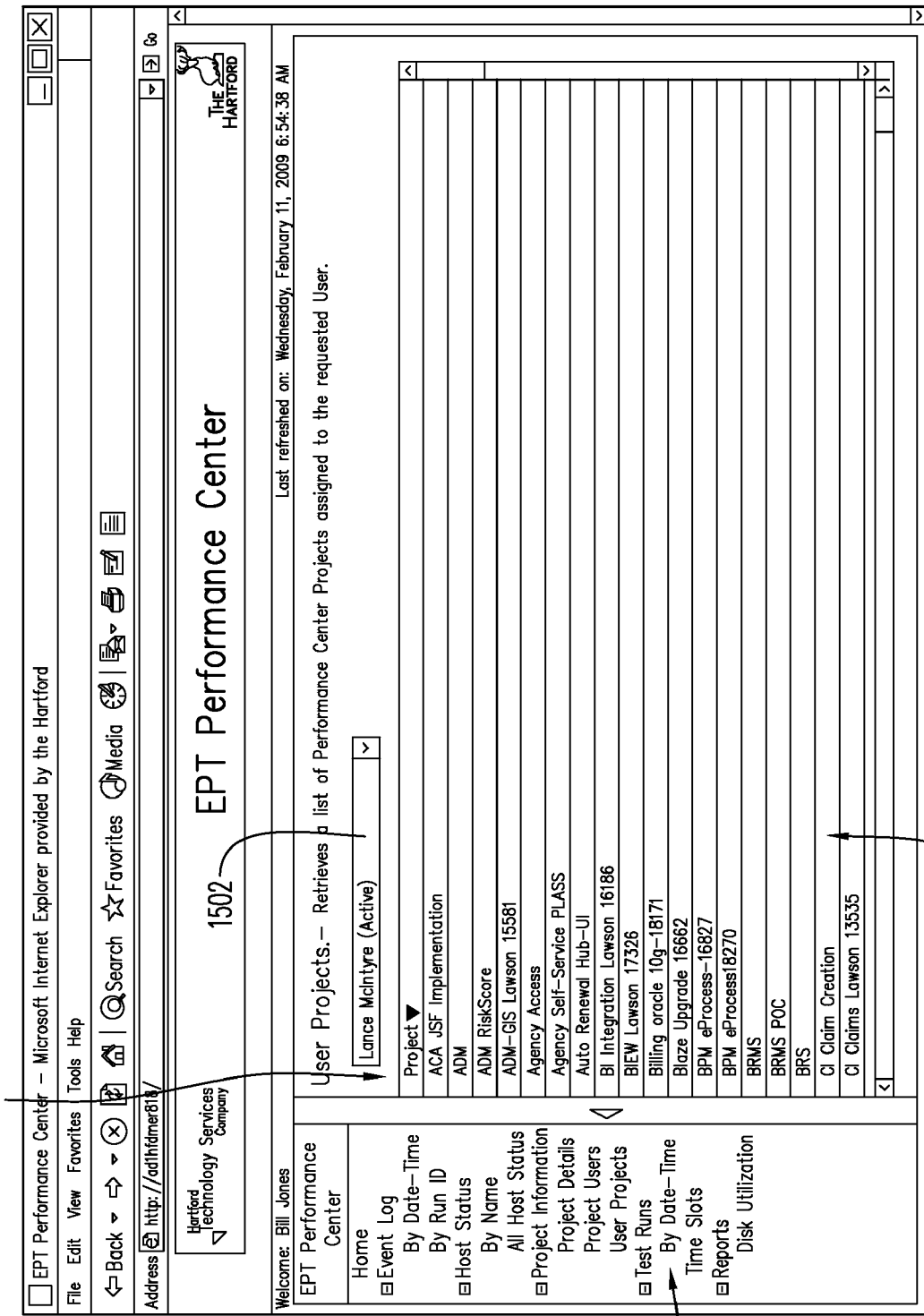

Referring to FIG. 15, the screen display shown therein includes the data entry field 1502, which indicates the name of the user selected to be the subject of the data retrieval and display. In addition, in the main window 1504 the screen display includes a single column 1506 of information. (This column 1506 may also be considered to constitute a data table. Also, the screen display may in some embodiments include additional columns of information, which are not shown.) Each entry in the column 1506 indicates a respective performance testing project to which the selected user has been assigned. Collectively, the entries may correspond to all of the performance testing projects to which the selected user has been assigned.

Figure 16:
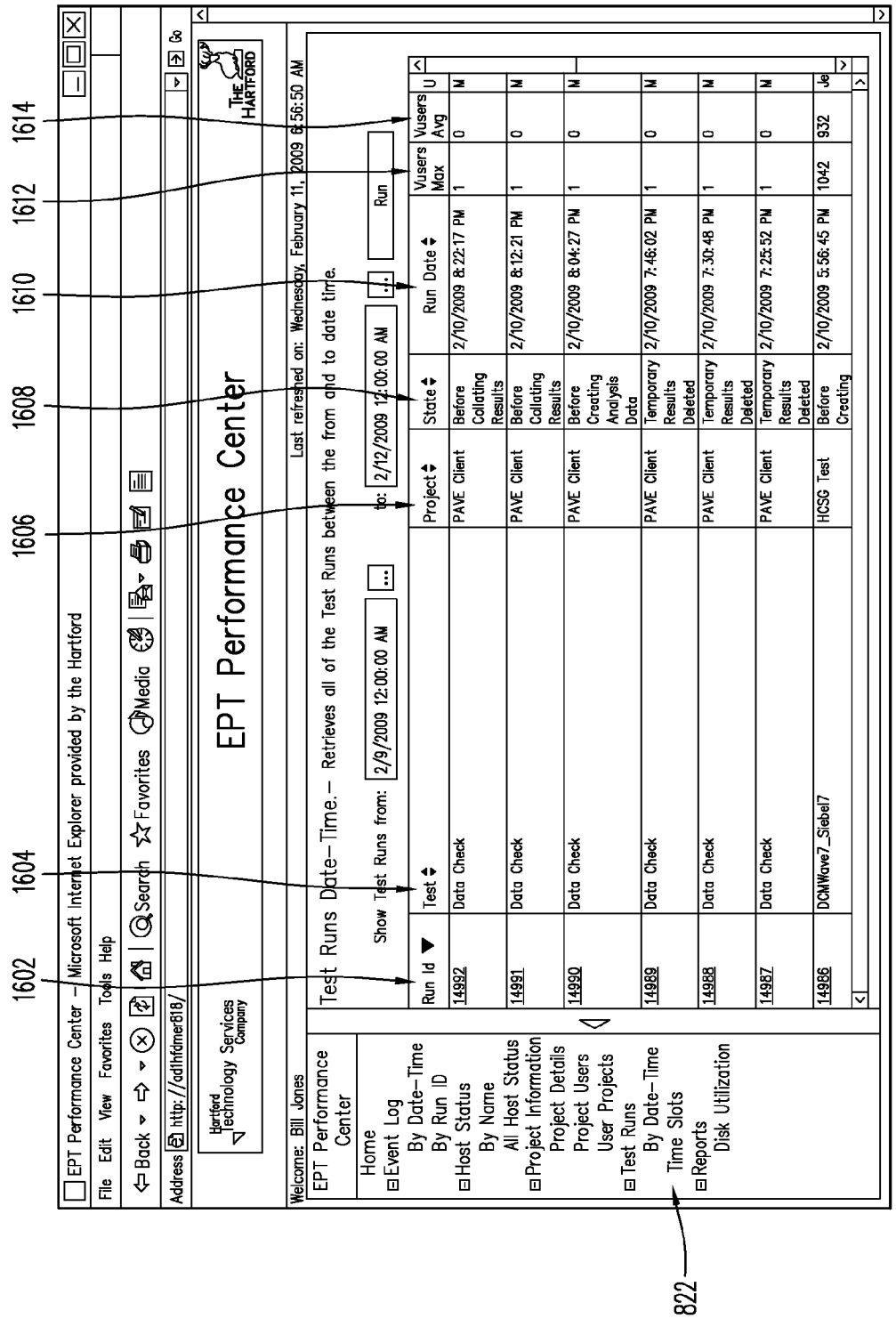

If the user selects menu item 820 (Test Runs By Date-Time; see FIG. 15, also available in other screen displays), then by a similar process as described above data is requested and retrieved and then assembled by the test data presentation module 112 to generate the screen display shown in FIG. 16. To obtain the screen display, the user may need to specify a time interval for which the desired information is to be retrieved and displayed.

In the data table shown in FIG. 16, each row corresponds to a particular test run that was executed during the selected time interval. A column 1602 indicates the test run in question by Run ID. A column 1604 indicates the nature of the test executed by the test run in question. A column 1606 indicates the performance testing project for which the test run in question was executed. A column 1608 indicates the state of the test run in question. A column 1610 indicates the date and time of execution of the test run in question. A column 1612 indicates the maximum number of virtual users employed in the test run. A column 1614 indicates the average number of virtual users employed in the test run. The data table may include other columns as well which are not visible in the screen display of FIG. 16.

Figure 17:
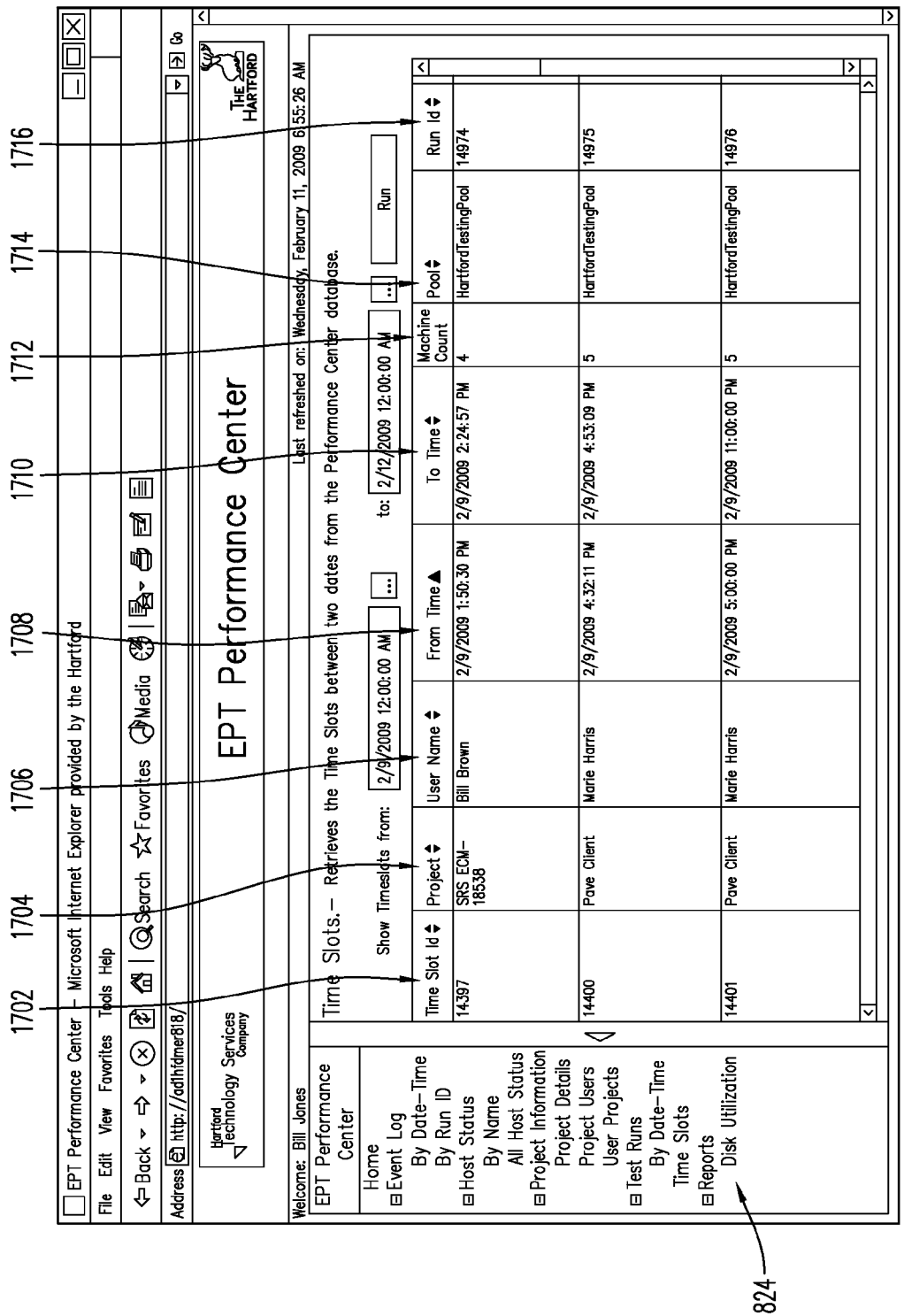

If the user selects menu item 822 (Time Slots; see FIG. 16, also available from other screen displays), then data is requested and retrieved, by a similar process as described above, and then assembled by the test data presentation module 112 to generate the screen display shown in FIG. 17. To obtain the screen display shown in FIG. 17, the user may need to specify a particular time interval for which the information is to be retrieved and displayed.

In the data table shown in FIG. 17 each row corresponds to a time slot that had been set aside for use in performance testing. A column 1702 indicates the unique identifier for the time slot. A column 1704 indicates the performance testing project for which the time slot in question was set aside. A column 1706 indicates the user for whom the time slot in question was set aside. A column 1708 indicates the date and time which defined the beginning of the time slot in question. A column 1710 indicates the date and time which defined the end of the time slot in question. A column 1712 indicates the number of computers set aside for use in performance testing during the time slot in question. A column 1714 indicates a pool of computers from which the computers were set aside for use in performance testing during the time slot. A column 1716 indicates the unique identifier for the test run performed during the time slot.

Figure 18:
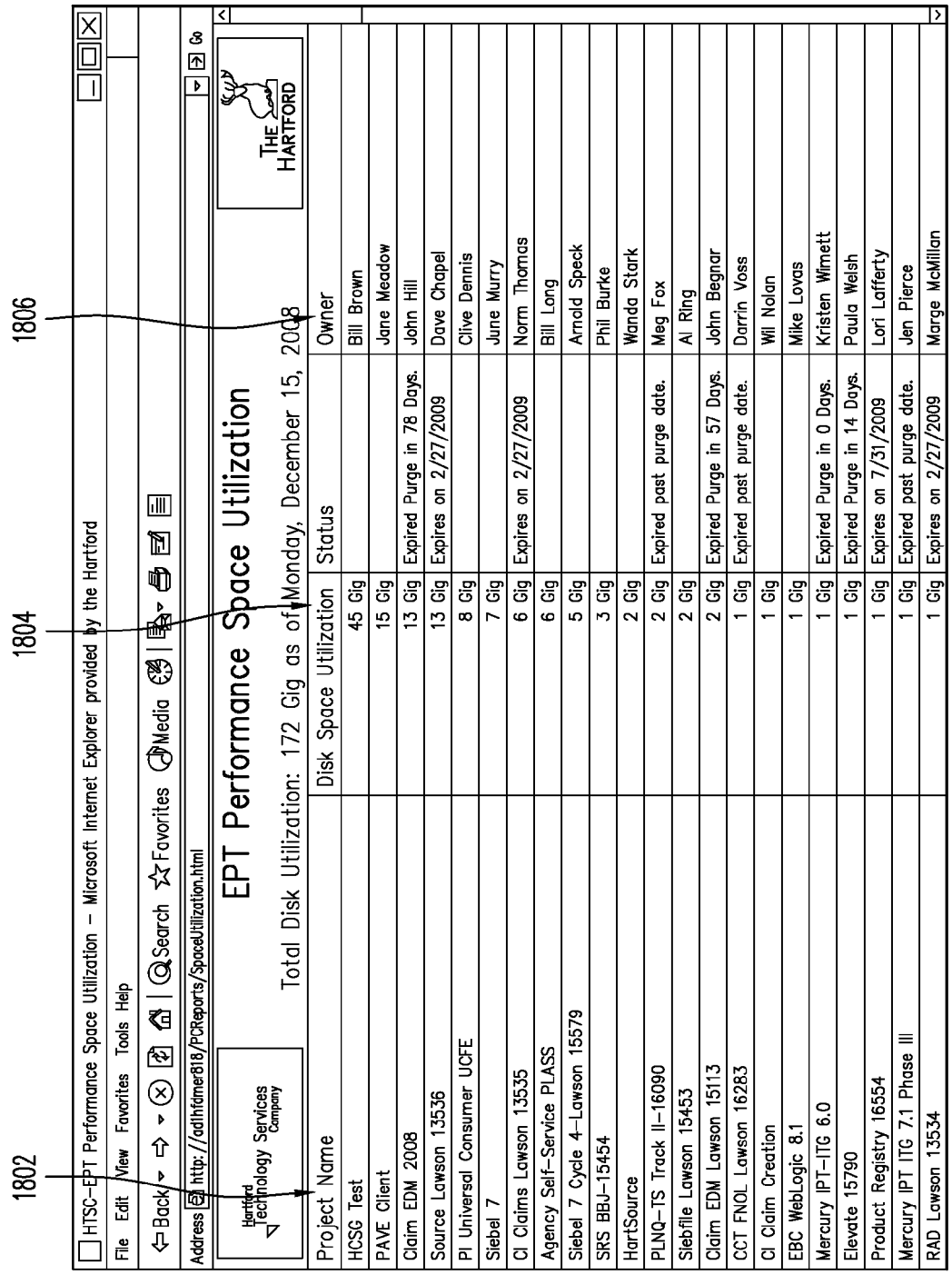

If the user selects menu item 824 (Disk Utilization Report; see FIG. 17, also available in other screen displays), then data is requested and retrieved by a process similar to those described above, and the data is then assembled by the test data presentation module 112 to generate the screen display shown in FIG. 18. The screen display shown in FIG. 18 presents a report in the form of a data table having three columns. Each row of the data table corresponds to a respective performance testing project. A column 1802 identifies the project by name. A column 1804 indicates what quantity of disk space the project in question is currently utilizing. A column 1806 indicates the users who are the "owners" of the project in question.

In some embodiments, the data retrieval and display options illustrated in FIGS. 8-18 may be made available to IT professionals who have some role in connection with performance testing of the computer system 100. Still further data retrieval and display options, illustrated in FIGS. 19-23, may be made available to all end users of the computer system 100, including the IT professionals involved in performance testing. (Alternatively, in some embodiments, all of the data retrieval and display options described herein may be made available to all of the end users of the computer system 100.) In some embodiments, the screen displays shown in FIGS. 8-18 are accessible via one website hosted by the test data presentation module 112, and the screen displays shown in FIGS. 19-23 are accessible via a different website hosted by the test data presentation module 112.

Figure 19:
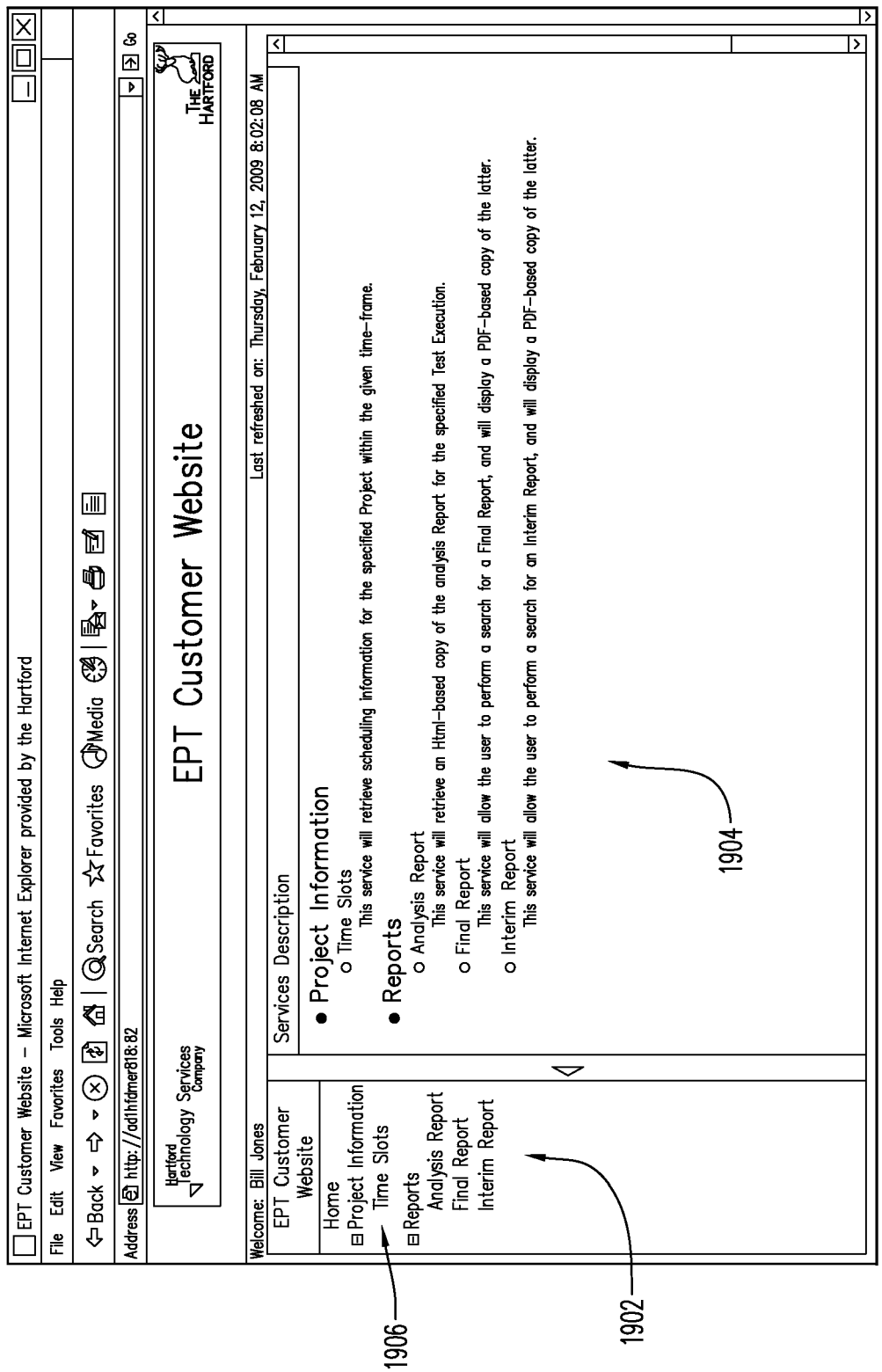

The screen display shown in FIG. 19 may be generated by the test data presentation module 112 for rendering by a user computer 104 in response to the user computer accessing the test data presentation module 112. The screen display of FIG. 19 includes a menu 1902 that lists services available to the user from the test data presentation module 112. In a main window 1904 of the screen display, text is displayed to provide brief descriptions to the user regarding the information available in response to selection of each of the menu items in the menu 1902.

Figure 20:
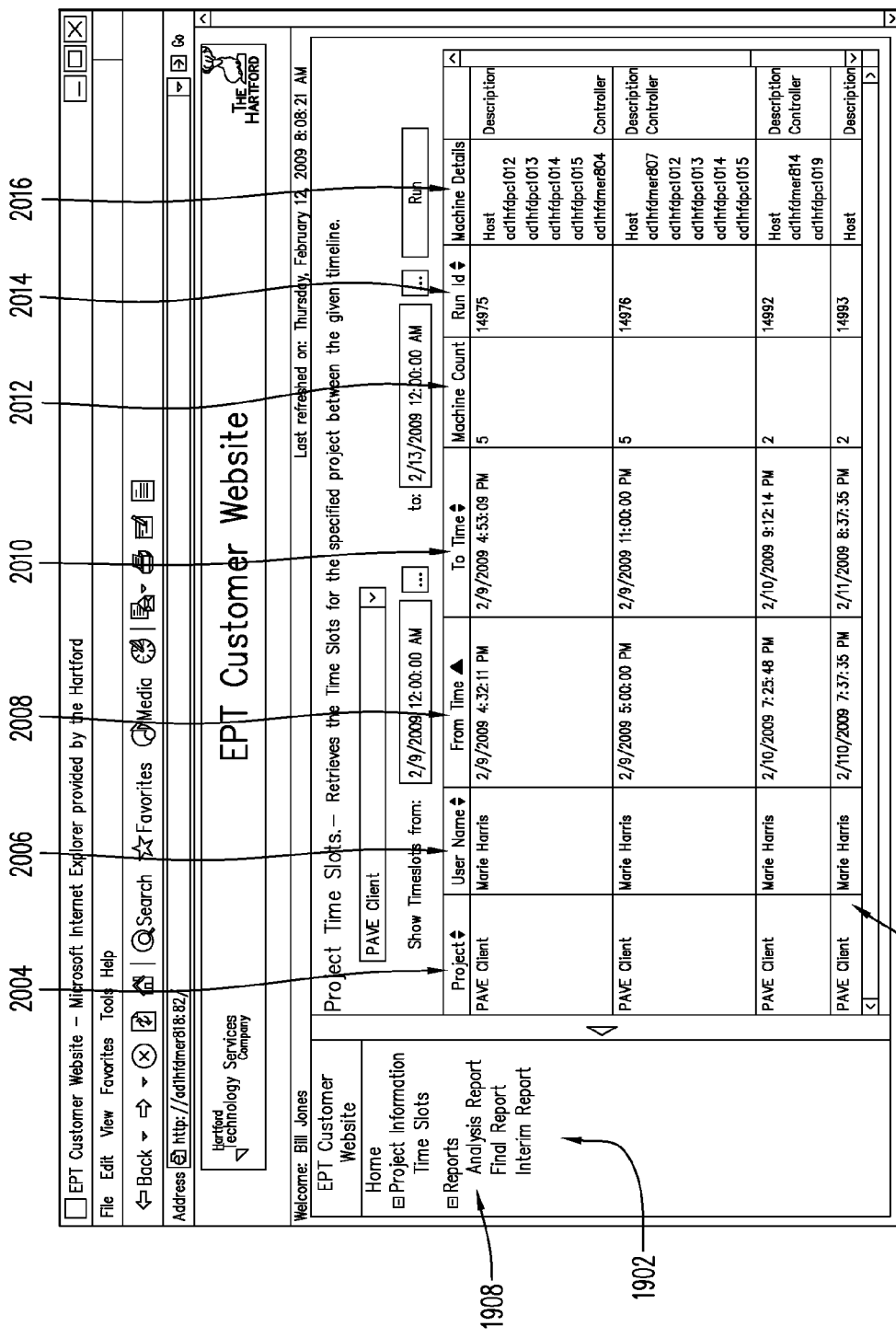

If the user selects item 1906 (Project Information—Time Slots) from the menu 1902 shown in FIG. 19, then a screen display (not shown) is presented to the user to enter/select the name of a performance testing project for which time slot information is to be retrieved and displayed and to select a time interval to be covered by the requested data. In response to the user's selection of the project, time slot data is requested and retrieved in a similar manner as described above. The test data presentation module 112 uses this data to generate a screen display as shown in FIG. 20. It will be noted that in its main window 2002, the screen display of FIG. 20 is generally similar to FIG. 17. In the data table shown in FIG. 20, each row corresponds to a time slot that had been set aside for use in performance testing. A column 2004 indicates the performance testing project in question. A column 2006 indicates the user for the time slot. A column 2008 indicates the date and time which defined the beginning of the time slot. A column 2010 indicates the date and time which defined the end of the time slot. A column 2012 indicates the number of computers set aside for use in performance testing during the time slot. A column 2014 indicates the unique identifier for a test run performed during the test slot. A column 2016 provides details regarding the computers set aside for use in performance testing during the time slot.

If a user selects menu item 1908 (Analysis Report) from the menu 1902 (FIG. 20, also seen in FIG. 19 and other drawings), then a screen display (not shown) is presented to the user to allow the user to select a load test execution for which an Analysis Report is to be generated and displayed. In the latter screen display (i.e., the one which is not shown) a series of three drop down lists may be provided (seen as elements 2102, 2104 and 2106 in FIG. 21) to allow the user to select, in sequence, a performance testing project, a load test and a particular execution of the load test. The latter two drop down lists may be dynamically populated depending on the items selected from the first or the first and second drop down lists.

Figure 21:
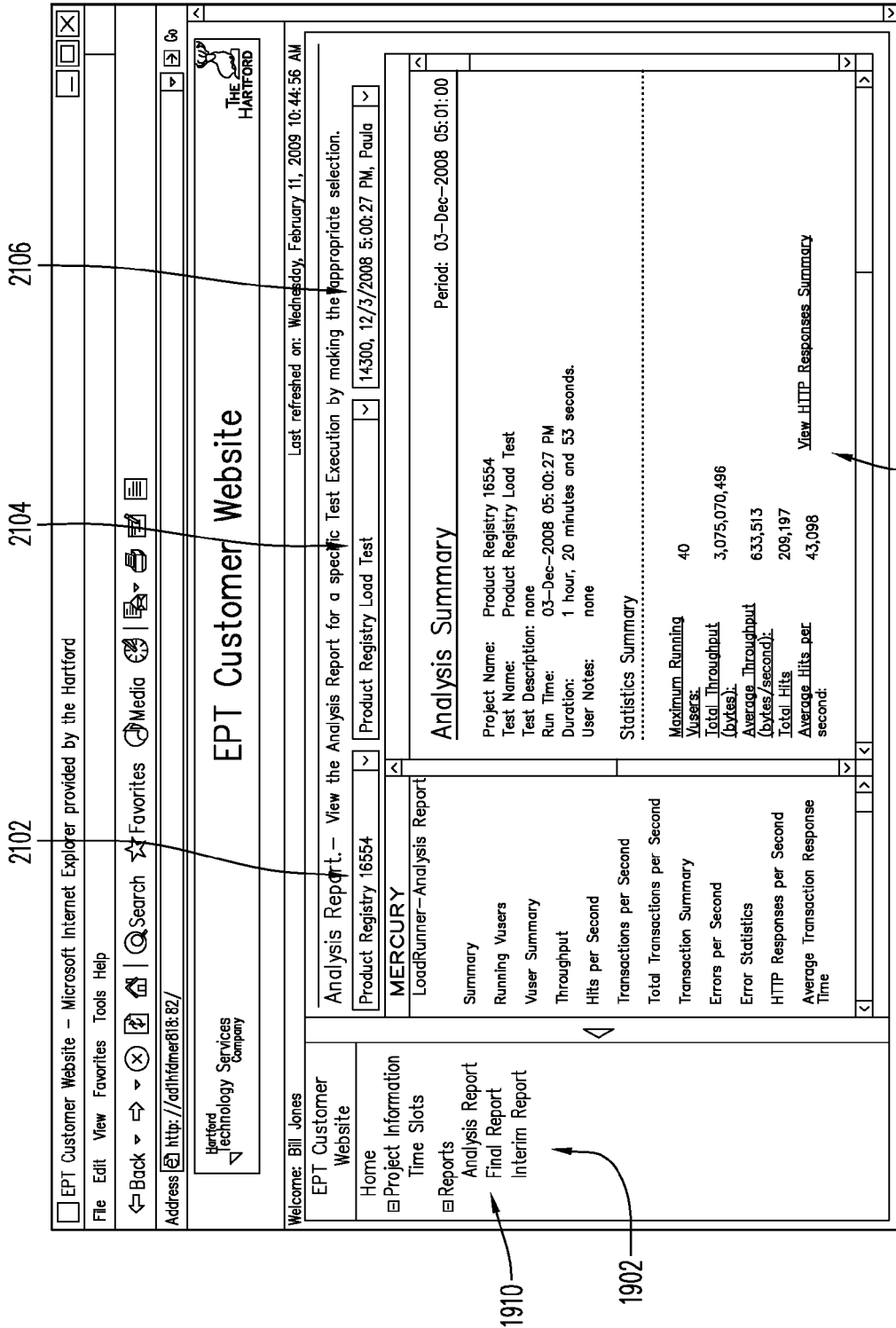

Referring now to FIG. 21, the screen display shown therein includes a main window 2108 in which the Analysis Report itself is displayed. It will be appreciated that the user is able to scroll down and/or across to view the entire report. In some embodiments, the Analysis Report may be generated automatically upon request by the performance testing controller 108 (e.g., in response to the user accessing the test data presentation module 112, and the test data presentation module 112 forwarding the request to the performance testing controller 108). In other embodiments, the Analysis Report may be generated by a human author, or partly authored by a human and partly generated automatically. The Analysis Report may provide considerable details about the test execution selected by the requesting user, including for example details about what virtual transactions were executed as part of the test execution. In addition, as seen from FIG. 21, the Analysis Report may include summary statistics about the performing and results of the test execution.

If the user selects menu item 1910 (Final Report) from the menu 1902 (FIG. 21, also seen in other drawings), then the user is prompted (through a screen display which is not shown) to enter or select the name of a completed performance testing project for which the user wishes to view the Final Report. For example, portions of the Final Reports may be generated automatically by the performance testing controller 108 and other parts may be authored by individuals who were involved in the project in question. In other embodiments, the Final Reports may be entirely authored by individuals.

Figure 22:
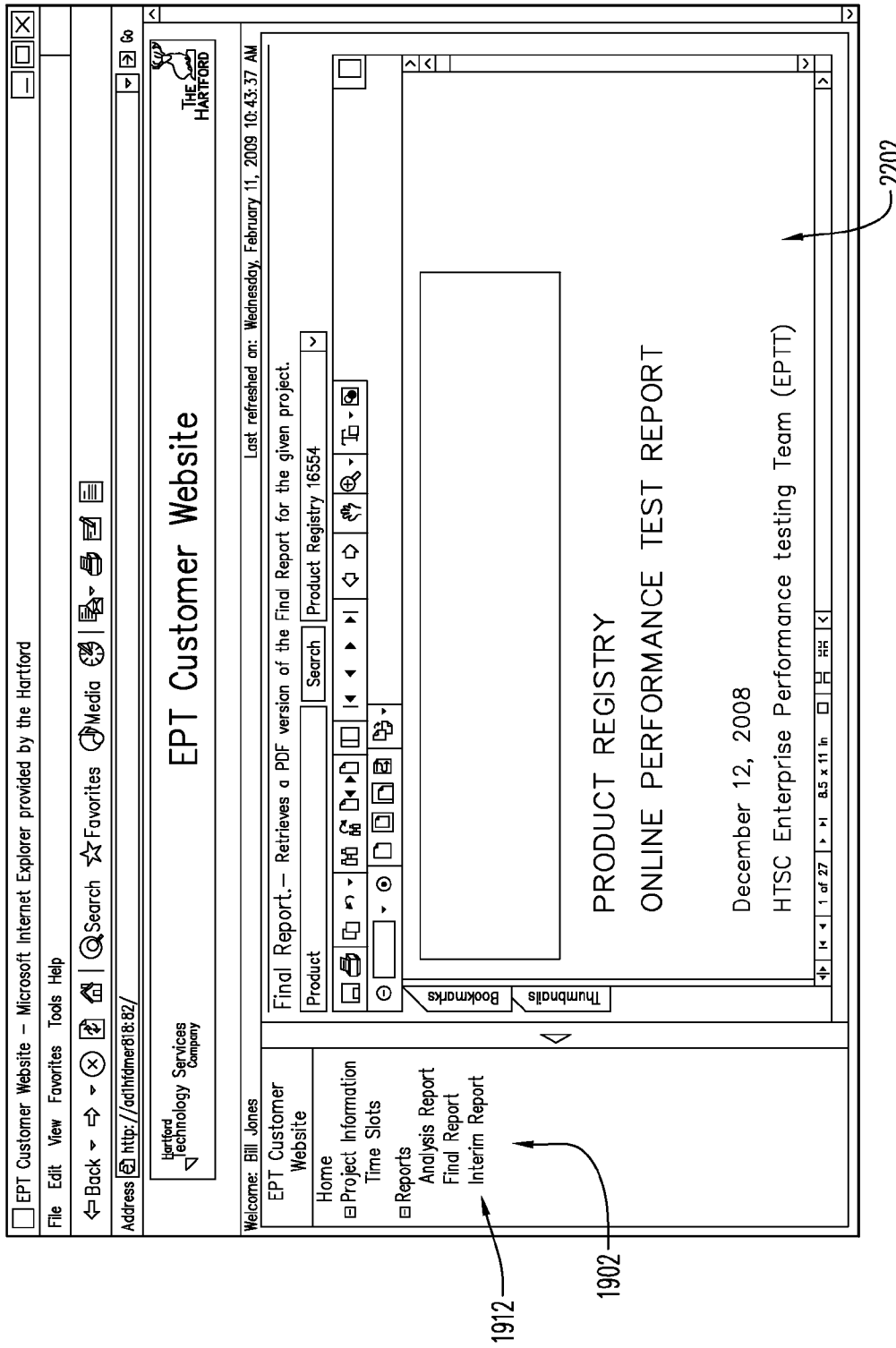

Referring now to FIG. 22, the screen display shown therein includes a main window 2202 which displays a PDF version of the Final Report. The Final Report may for example include a summary of the types of information present in the above-mentioned Analysis Reports for the test executions performed for the project, along with recommendations and additional findings generated by the individuals who executed and/or supervised the project.

If the user selects menu item 1912 (Interim Report) from the menu 1902 (FIG. 22, also seen in other drawings), then— as when an Analysis Report is requested—a screen display (not shown) is provided to allow the user to select a load test execution for which an Interim Report is to be generated and displayed.

Figure 23:
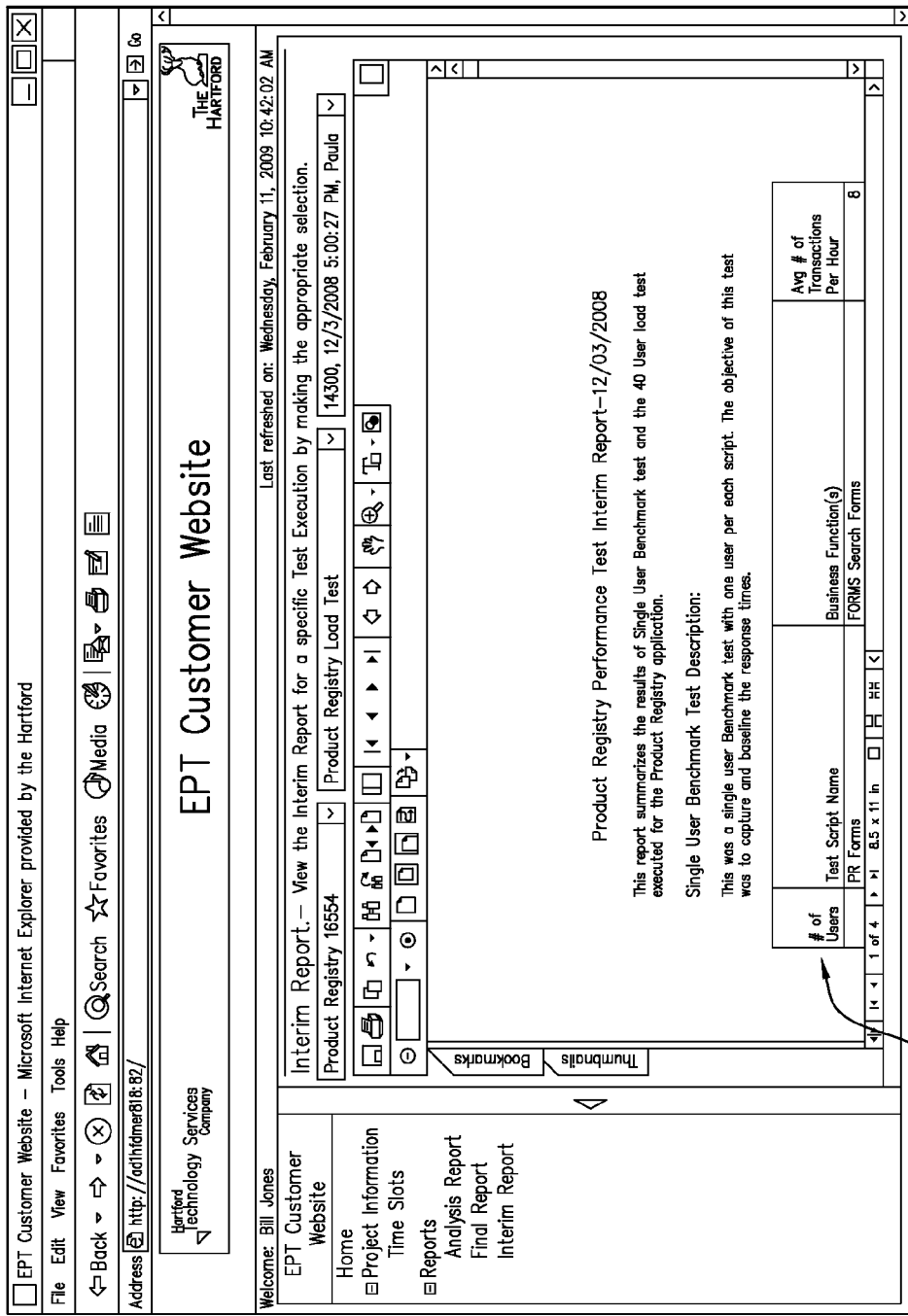

Referring now to FIG. 23, the screen display shown therein includes a main window 2302 in which the Interim Report is displayed. As with the other Reports mentioned above, the user is able to scroll down and/or across to view the entire report. In some embodiments, the Interim Report may correspond to the Final Report as described above, but (a) only for one test execution and (b) including only automatically generated summaries of test execution details. Thus, the Interim Report may lack any human-authored components such as recommendations and additional findings. The Interim Report may, for example be generated by the performance testing controller 108 in response to the user accessing the test data presentation module 112 and the test data presentation module 112 forwarding the request to the performance testing controller 108.

In other embodiments, the Interim Report may be generated by a human author, or partly authored by a human and partly generated automatically.

In addition to making available novel test data displays, the computer system 100 as described herein may also function to make available, to IT testing personnel and/or to ordinary end users, via the test data presentation module 112, performance test data that heretofore was only available to system administrators.

Although only one test database module is shown in FIG. 1 to be part of the computer system 100, in other embodiments the computer system 100 may include two or more test database modules.

The data display resources disclosed herein may be particularly helpful to a large insurance company or other large financial services company in that these data display resources may enhance the organization's ability to efficiently make application programs ready to perform as expected. This may also aid the organization in taking advantage of future growth opportunities. Satisfactory performance of application programs is critically important for business functions that provide interactions with customers, generate revenue, are sensitive to markets or are related to customer service.

The term "server" as used herein and in the appended claims, refers to standalone server computers and also "virtual servers" provided as part of the functionality of a server or other computer.

As used herein and in the appended claims, the term "test data" includes data produced by a performance test, data generated by summarizing, analyzing or processing such data, and data relating to attributes of a performance test project.

The process descriptions and flow charts contained herein should not be considered to imply a fixed order for performing process steps. Rather, process steps may be performed in any order that is practicable.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer system comprising:
   one or more server computers, each including at least one processing unit;
   a plurality of application program storage modules, each coupled to at least one of said processing units and each storing at least one application program to be executed on at least one of the processing units;
   a communication network, the one or more server computers coupled to the communication network;
   a plurality of client computers coupled to the communication network, each of the client computers including a respective display unit, at least some of the client computers and/or server computers programmed to execute performance test scripts, said performance test scripts when executed by the client computers and/or server computers causing the client computers and/or server computers to exercise at least one of the application programs in a manner that simulates access to the at least one of the application programs by a respective user;
   at least one database storage module, coupled to at least one of the processing units and storing event data, the event data logging events that occur in the one or more server computers while the at least one application program is exercised by the client computers and/or server computers in a plurality of test runs, said test runs performed in connection with a plurality of projects, each of the projects defined for performance testing a respective one of the plurality of application programs; and
   a test data presentation module coupled to the at least one database storage module, the test data presentation module accessible by at least one of the client computers such that the test data presentation module generates a test data screen display for rendering by the at least one of the client computers via the display unit of the at least one client computer, the test data screen display including a data table, the data table presenting event data retrieved by the test data presentation module from the at least one database storage module, the test data screen display including data arrayed in said data table in a plurality of columns and a plurality of rows, each of said rows in said data table presenting data with respect to a respective event that occurred during one of said test runs, a first one of said columns for presenting event identifiers for said respective events, a second one of said columns for presenting descriptions for said events, a third one of said columns for presenting test run identifiers for the test runs during which the events occurred, the rows of said data table collectively presenting data with respect to events that occurred during test runs for two or more of said projects;

wherein a first one of the projects for which data is in the table is for executing a first one of the application programs; and a second one of the projects for which data is in the table is for executing a second one of the application programs, the second one of the application programs different from the first one of the application programs.

2. The computer system of claim 1, wherein:
said data table comprises a respective entry for every event that occurred during any of said test runs during a selected period of time.

3. The computer system of claim 2, wherein said selected period of time is indicated in said test data screen display.

4. The computer system of claim 1, wherein a fourth one of said columns identifies software components that are sources of the events.

5. The computer system of claim 4, wherein a fifth one of said columns indicates severities of the events.

6. The computer system of claim 5, wherein a sixth one of said columns identifies ones of said server computers in which said events occurred.

7. The computer system of claim 6, wherein a seventh one of said columns indicates dates and times at which said events occurred.

8. The computer system of claim 1, wherein:
said test data is representative of data generated by said at least one application program, said at least one application program for processing data used in providing insurance services.

9. A computer system comprising:
one or more server computers, each including at least one processing unit;
a plurality of application program storage modules, each coupled to at least one of said processing units and each storing at least one application program to be executed on at least one of the processing units;
a communication network, the one or more server computers coupled to the communication network;
a plurality of client computers coupled to the communication network, each of the client computers including a respective display unit, at least some of the client computers and/or server computers programmed to execute performance test scripts, said performance test scripts when executed by the client computers and/or server computers causing the client computers and/or server computers to exercise at least one of the application programs in a manner that simulates access to the at least one of the application programs by a respective user;
at least one database storage module, coupled to at least one of the processing units and storing test data, the test data related to a plurality of projects, each of the projects defined for performance testing a respective one of the plurality of application programs; and
a test data presentation module coupled to the at least one database storage module, the test data presentation module accessible by at least one of the client computers such that the test data presentation module generates a first test data screen display for rendering by the at least one of the client computers via the display unit of the at least one client computer, the first test data screen display including a first data table, the first data table presenting test data retrieved by the test data presentation module from the at least one database storage module, the first test data screen display including data arrayed in said first data table in a plurality of columns and a plurality of rows, each of said rows in said first data table indicating a respective user assigned to a selected one of said projects, said first data table comprising rows that correspond to all users assigned to said selected project; said test data presentation module also generating a second test data screen display for rendering by the at least one client computer, the second test data screen display including a second data table, the second data table presenting test data retrieved by the test data presentation module from the at least one database storage module, the second test data screen display including data arrayed in said second data table in at least one column, the column of the second data table having a plurality of entries and each of the entries in the column of the second data table indicating a respective project to which a selected user is assigned, said second data table comprising entries that correspond to all projects to which said selected user is assigned.

10. The computer system of claim 9, wherein said first screen display includes an indication that identifies said selected project.

11. The computer system of claim 10, wherein said indication is an item selected from a drop-down menu.

12. The computer system of claim 9, wherein said first data table is a listing of the users assigned to said selected project.

13. The computer system of claim 12, wherein said first data table does not list any users who are not assigned to said selected project.

14. The computer system of claim 9, wherein said second data table is a listing of the projects to which the selected user is assigned.

15. The computer system of claim 14, wherein said second data table does not list any projects to which the selected user is not assigned.

16. The computer system of claim 9, wherein:
a first one of the projects listed in the second data table is for exercising a first one of the application programs; and
a second one of the projects listed in the second data table is for exercising a second one of the application programs, the second one of the application programs different from the first one of the application programs.

17. The computer system of claim 9, wherein:
said at least one application program is for processing data used in providing insurance services.

18. A non-transitory computer-readable medium storing processor-executable program code for displaying event data, the event data logging events that occur in one or more server computers while at least one application program is exercised in a plurality of test runs, said test runs performed in connection with a plurality of projects, each of the projects designed for performance testing a respective one of the plurality of application programs, the computer readable program code means in said computer-readable medium comprising:
computer readable program code means for retrieving said event data from at least one database storage module; and
computer readable program code means for generating a test data screen display for rendering by a client computer via a display unit of the client computer, the test data screen display including a data table, the data table presenting the event data retrieved from the at least one database storage module, the test data screen display including data arrayed in said data table in a plurality of columns and a plurality of rows, each of said rows in said data table presenting data with respect to a respective event that occurred during one of said test runs, a first one of said columns for presenting event identifiers for said respective events, a second one of said columns for presenting descriptions for said events, a third one of said columns for presenting test run identifiers for the test runs during which the events occurred, the rows of said data table collectively presenting data with respect to events that occurred during test runs for two or more of said projects;

wherein a first one of the projects for which data is in the table is for executing a first one of the application programs; and a second one of the projects for which data is in the table is for executing a second one of the application programs, the second one of the application programs different from the first one of the application programs.

19. A non-transitory computer-readable medium storing processor-executable program code for displaying test data, the test data related to a plurality of projects, each of the projects defined for performance testing a respective one of a plurality of application programs, the computer readable program code means in said computer-readable medium comprising:

computer readable program code means for retrieving said test data from at least one database storage module;

computer readable program code means for generating a first test data screen display for rendering by a client computer via a display unit of the client computer, the first test data screen display including a first data table, the first data table presenting test data retrieved by the test data presentation module from the at least one database storage module, the first test data screen display including data arrayed in said first data table in a plurality of columns and a plurality of rows, each of said rows in said first data table indicating a respective user assigned to a selected one of said projects, said first data table comprising rows that correspond to all users assigned to said selected project; and computer readable program code means for generating a second test data screen display for rendering by the client computer via the display unit of the client computer, the second test data screen display including a second data table, the second data table presenting test data retrieved by the test data presentation module from the at least one database storage module, the second test data screen display including data arrayed in said second data table in at least one column, the column of the second data table having a plurality of entries and each of the entries in the column of the second data table indicating a respective project to which a selected user is assigned, said second data table comprising entries that correspond to all projects to which said selected user is assigned.

* * * * *